United States Patent
Topchy et al.

(10) Patent No.: US 8,458,737 B2
(45) Date of Patent: Jun. 4, 2013

(54) METHODS AND APPARATUS FOR GENERATING SIGNATURES

(75) Inventors: Alexander Topchy, New Port Richey, FL (US); Venugopal Srinivasan, Palm Harbor, FL (US)

(73) Assignee: The Nielsen Company (US), LLC, Schaumburg, IL (US)

(*) Notice: Subject to any disclaimer, the term of this patent is extended or adjusted under 35 U.S.C. 154(b) by 1091 days.

(21) Appl. No.: 12/110,951

(22) Filed: Apr. 28, 2008

(65) Prior Publication Data

US 2008/0276265 A1    Nov. 6, 2008

Related U.S. Application Data

(60) Provisional application No. 60/915,529, filed on May 2, 2007.

(51) Int. Cl.
*H04H 60/32* (2008.01)

(52) U.S. Cl.
USPC .......... 725/18; 725/9; 725/22; 704/205; 713/176

(58) Field of Classification Search
USPC .......... 704/205; 725/22, 9, 18; 713/176
See application file for complete search history.

(56) References Cited

U.S. PATENT DOCUMENTS

| | | |
|---|---|---|
| 3,845,391 A | 10/1974 | Crosby |
| 3,919,479 A | 11/1975 | Moon et al. |
| 4,025,851 A | 5/1977 | Haselwood et al. |
| 4,053,710 A | 10/1977 | Advani et al. |
| 4,230,990 A | 10/1980 | Lert, Jr. et al. |
| 4,282,403 A | 8/1981 | Sakoe |
| 4,432,096 A | 2/1984 | Bunge |
| 4,450,531 A | 5/1984 | Kenyon et al. |
| 4,520,830 A | 6/1985 | Flanagan, III |
| 4,533,926 A | 8/1985 | Foldvari et al. |
| 4,547,804 A | 10/1985 | Greenberg |
| 4,624,009 A | 11/1986 | Glenn et al. |
| 4,639,779 A | 1/1987 | Greenberg |

(Continued)

FOREIGN PATENT DOCUMENTS

| | | |
|---|---|---|
| AU | 678163 | 11/1993 |
| AU | 718227 | 11/1997 |

(Continued)

OTHER PUBLICATIONS

International Bureau, International Preliminary Report on Patentability for PCT/US2008/061783, Nov. 3, 2009, 8 pages.

(Continued)

*Primary Examiner* — Talivaldis Ivars Smits
*Assistant Examiner* — Shaun Roberts
(74) *Attorney, Agent, or Firm* — Hanley, Flight & Zimmerman, LLC

(57) ABSTRACT

Methods and apparatus for characterizing media are described. In one example, a method of characterizing media includes capturing a block of audio; converting at least a portion of the block of audio into a frequency domain representation; dividing the frequency domain representation into a plurality of bands; determining a characteristic difference of a first band of the plurality of bands based on a comparison of a characteristic of the first band and a characteristic of a second band different from the first band, wherein the characteristic of the first band occurs at a time that is different than a time at which the characteristic of the second band takes place; and determining a signature bit based on a characteristic difference. Other examples are shown and described.

31 Claims, 12 Drawing Sheets

U.S. PATENT DOCUMENTS

| | | |
|---|---|---|
| 4,677,466 A | 6/1987 | Lert, Jr. et al. |
| 4,697,209 A | 9/1987 | Kiewit et al. |
| 4,703,476 A | 10/1987 | Howard |
| 4,739,398 A | 4/1988 | Thomas et al. |
| 4,783,660 A | 11/1988 | Pierce |
| 4,805,020 A | 2/1989 | Greenberg |
| 4,834,724 A | 5/1989 | Geiss et al. |
| 4,843,562 A | 6/1989 | Kenyon et al. |
| 4,931,871 A | 6/1990 | Kramer |
| 4,945,412 A | 7/1990 | Kramer |
| 4,947,436 A | 8/1990 | Greaves et al. |
| 4,967,273 A | 10/1990 | Greenberg |
| 5,023,929 A | 6/1991 | Call |
| 5,113,437 A | 5/1992 | Best et al. |
| 5,121,428 A | 6/1992 | Uchiyama et al. |
| 5,210,820 A | 5/1993 | Kenyon |
| 5,319,735 A | 6/1994 | Preuss et al. |
| 5,436,653 A | 7/1995 | Ellis et al. |
| 5,437,050 A | 7/1995 | Lamb et al. |
| 5,450,490 A | 9/1995 | Jensen et al. |
| 5,504,518 A | 4/1996 | Ellis et al. |
| 5,563,942 A | 10/1996 | Tulai |
| 5,572,246 A | 11/1996 | Ellis et al. |
| 5,579,124 A | 11/1996 | Aijala et al. |
| 5,581,800 A | 12/1996 | Fardeau et al. |
| 5,612,729 A | 3/1997 | Ellis et al. |
| 5,621,454 A | 4/1997 | Ellis et al. |
| 5,629,739 A | 5/1997 | Dougherty |
| 5,650,943 A | 7/1997 | Powell et al. |
| 5,687,191 A | 11/1997 | Lee et al. |
| 5,764,763 A | 6/1998 | Jensen et al. |
| 5,792,053 A | 8/1998 | Skladnev et al. |
| 5,822,360 A | 10/1998 | Lee et al. |
| 5,941,822 A | 8/1999 | Skladnev et al. |
| 6,002,443 A | 12/1999 | Iggulden |
| 6,026,323 A | 2/2000 | Skladnev et al. |
| 6,061,793 A | 5/2000 | Tewfik et al. |
| 6,151,578 A | 11/2000 | Bourcet et al. |
| 6,167,400 A | 12/2000 | Brandin |
| 6,170,060 B1 | 1/2001 | Mott et al. |
| 6,205,249 B1 | 3/2001 | Moskowitz |
| 6,272,176 B1 | 8/2001 | Srinivasan |
| 6,286,005 B1 | 9/2001 | Cannon |
| 6,317,703 B1 | 11/2001 | Linsker |
| 6,421,445 B1 | 7/2002 | Jensen et al. |
| 6,442,283 B1 | 8/2002 | Tewfik et al. |
| 6,469,749 B1 | 10/2002 | Dimitrova et al. |
| 6,604,072 B2 | 8/2003 | Pitman et al. |
| 6,711,540 B1 | 3/2004 | Bartkowiak |
| 6,751,337 B2 | 6/2004 | Tewfik et al. |
| 6,871,180 B1 | 3/2005 | Neuhauser et al. |
| 6,968,564 B1 | 11/2005 | Srinivasan |
| 6,996,237 B2 | 2/2006 | Jensen et al. |
| 7,006,555 B1 | 2/2006 | Srinivasan |
| 7,013,468 B2 | 3/2006 | Abercrombie et al. |
| 7,058,223 B2 | 6/2006 | Cox |
| 7,171,016 B1 | 1/2007 | Rhoads |
| 7,194,752 B1 | 3/2007 | Kenyon et al. |
| 7,289,643 B2 | 10/2007 | Brunk et al. |
| 7,302,574 B2 | 11/2007 | Conwell et al. |
| 7,316,025 B1 | 1/2008 | Aijala et al. |
| 7,328,153 B2 | 2/2008 | Wells et al. |
| 7,343,492 B2 | 3/2008 | Moskowitz et al. |
| 7,698,008 B2 | 4/2010 | Steinberg |
| 7,712,114 B2 | 5/2010 | Ramaswamy |
| 7,783,889 B2 | 8/2010 | Srinivasan |
| 7,921,296 B2 | 4/2011 | Haitsma et al. |
| 2001/0051996 A1 | 12/2001 | Cooper et al. |
| 2002/0082731 A1 | 6/2002 | Pitman et al. |
| 2002/0082837 A1 | 6/2002 | Pitman et al. |
| 2002/0126872 A1 | 9/2002 | Brunk et al. |
| 2003/0005430 A1 | 1/2003 | Kolessar |
| 2003/0054757 A1 | 3/2003 | Kolessar et al. |
| 2003/0131350 A1 | 7/2003 | Peiffer et al. |
| 2003/0179909 A1 | 9/2003 | Wong et al. |
| 2004/0122679 A1 | 6/2004 | Neuhauser et al. |
| 2004/0170381 A1 | 9/2004 | Srinivasan |
| 2004/0181799 A1 | 9/2004 | Lu et al. |
| 2005/0025334 A1 | 2/2005 | Tewfik et al. |
| 2005/0035857 A1 | 2/2005 | Zhang et al. |
| 2005/0043830 A1 | 2/2005 | Lee et al. |
| 2005/0200476 A1 | 9/2005 | Forr et al. |
| 2005/0203798 A1 | 9/2005 | Jensen et al. |
| 2005/0216509 A1 | 9/2005 | Kolessar et al. |
| 2005/0232411 A1 | 10/2005 | Srinivasan et al. |
| 2005/0243784 A1 | 11/2005 | Fitzgerald et al. |
| 2005/0268798 A1 | 12/2005 | Neuhauser et al. |
| 2005/0272015 A1 | 12/2005 | Jensen et al. |
| 2005/0272017 A1 | 12/2005 | Neuhauser et al. |
| 2006/0020958 A1 | 1/2006 | Allamanche et al. |
| 2006/0028953 A1 | 2/2006 | Jensen et al. |
| 2006/0075237 A1 | 4/2006 | Seo et al. |
| 2006/0120536 A1 | 6/2006 | Kemp |
| 2006/0195886 A1 | 8/2006 | Ashley |
| 2006/0239503 A1 | 10/2006 | Petrovic et al. |
| 2007/0005118 A1 | 1/2007 | Carter et al. |
| 2007/0199013 A1 | 8/2007 | Samari et al. |
| 2007/0274537 A1 | 11/2007 | Srinivasan |
| 2007/0286451 A1 | 12/2007 | Rhoads |
| 2007/0300066 A1 | 12/2007 | Srinivasan |
| 2008/0276265 A1 | 11/2008 | Topchy et al. |
| 2009/0225994 A1 | 9/2009 | Topchy et al. |

FOREIGN PATENT DOCUMENTS

| | | |
|---|---|---|
| AU | 747044 | 9/2000 |
| AU | 2006203639 | 9/2006 |
| CA | 2041754 | 11/1991 |
| CA | 2504552 | 11/1993 |
| CA | 2628654 | 11/1993 |
| CA | 2136054 | 5/1996 |
| CA | 2134748 | 7/2005 |
| CN | 1461565 | 12/2003 |
| DE | 69334130 | 12/2007 |
| DK | 1261155 | 8/2007 |
| EP | 0245037 | 11/1987 |
| EP | 0385799 | 5/1990 |
| EP | 0598682 | 11/1993 |
| EP | 0748563 A1 | 12/1996 |
| EP | 0887958 A1 | 12/1996 |
| EP | 0887958 | 12/1998 |
| EP | 1261155 A2 | 11/2002 |
| EP | 0748563 B1 | 1/2003 |
| EP | 0887958 B1 | 1/2003 |
| EP | 1261155 A3 | 9/2003 |
| EP | 1261155 B1 | 3/2007 |
| ES | 2284777 | 11/2007 |
| FR | 2559002 | 8/1985 |
| GB | 2460773 | 12/2009 |
| JP | 8500471 | 1/1996 |
| PT | 1261155 | 7/2007 |
| WO | 8810540 | 12/1988 |
| WO | 9322875 | 11/1993 |
| WO | 9411989 | 5/1994 |
| WO | 9841140 | 9/1998 |
| WO | 0019699 | 4/2000 |
| WO | 00/35345 | 6/2000 |
| WO | 0079709 | 12/2000 |
| WO | 02065782 | 8/2002 |
| WO | 03009277 | 1/2003 |
| WO | 03057605 | 7/2003 |
| WO | 2006023770 | 3/2006 |

OTHER PUBLICATIONS

Intellectual Property Office, GB Examination Report for Aplicaiton No. GB0915239.8, Sep. 18, 2009, 1 page.

European Patent Office, Office Communication issued for EP Application No. 08747030.8, dated Jan. 5, 2010, 3 pages.

International Searching Authority, International Search Report for PCT/US2008/082657, Apr. 7, 2009, 4 pages.

International Searching Authority, Written Opinion for PCT/US2008/082657, Apr. 7, 2009, 7 pages.

The State Intellectual Property Office of China, Office Action issued in connection with Chinese Application No. 2008/80012844.0, issued on Sep. 2, 2010 (12 pages).

Sukittanon, "Modulation-Scale Analysis for Content Identification," IEEE Transactions on Signal Processing, vol. 52, No. 10, Oct. 2004 (13 pages).

International Searching Authority, International Search Report for International application No. PCT/US2008/054434, Feb. 25, 2009, (4 pages).

International Searching Authority, Written Opinion for International application No. PCT/US2008/054434, Feb. 25, 2009, (9 pages).

Haitsma et al., "Robust Audio Hashing for Content Identification," Philips Research, philips.com, 2001, 8 pages.

International Preliminary Report on Patentability, issued in connection with International Patent Application No. PCT/US2008/054434, issued Aug. 26, 2009, mailed Sep. 3, 2009, 10 pages.

Wai-Kai Chen, The Circuits and Filters Handbook, p. 137, 149, 157, 163, 721 and 2696. 1995, CRC Press.

United Kingdom Radio Academy, Techcon Conference, http://www.ibs.org.uk/public/lineuparchive/2003/Aug-Sep/TECHCON_2003.pdf, 2 pages, Jul. 2003.

Crochiere, Cox and Johnston, "Real-Time Speech Coding," IEEE Transactions of Communications, vol. Com-30, No. 4, 13 pages, Apr. 1982.

Carter et al., PCT International Application No. PCT/AU99/01116, Filed Dec. 14, 1999.

David John Bull, Curriculum Vitae of David John Bull, shown and sworn on Dec. 23, 2005, 6 pages.

John Fredrick Arnold, Curriculum Vitae of John Fredrick Arnold, shown and sworn on Jun. 7, 2006, 39 pages.

Dr. Khok Khee Pang, Curriculum Vitae of Dr. Khok Khee Pang, shown and sworn on Mar. 27, 2006, 15 pages.

International Searching Authority, International Search Report for application No. PCT/US2008/061783, Jan. 29, 2009, 4 pages.

International Searching Authority, Written Opinion for application No. PCT/US2008/061783, Jan. 29, 2009, 7 pages.

Jaap Haitsma, Ton Kalker, "A Highly Robust Audio Fingerprinting System", 2002 IRCAM, 9 pages.

Jaap Haitsma, Ton Kalker and Job Oostveen, "Robust Audio Hashing for Content Identification" 2001, 8 pages.

International Preliminary Report on Patentability for PCT Application Serial No. PCT/US2008/082657, (7 pages). Sep. 7, 2010.

Australian Government, "Notice of Acceptance", issued in connection with Australian patent application No. 2008218716, Apr. 30, 2012, (3 pages).

Australian Patent Office, "Patent Abridgement," issued in connection with Australian Application No. 42260/93, Document No. AU-B-42260/93, (144 pages).

Blaser, Stefan, "Teleconrol Submission Listing Further Art," AMMANN Patent Attorneys Limited, Berne, written in connection with European Application No. 02076018.7-2223/1261155, Appeal No. T1118/10-3503, Jul. 21, 2009, (25 pages).

Canadian Intellectual Property Office, "Office action", issued in connection with Canadian Patent Application No. 2,717,723, Mar. 28, 2012, (3 pages).

Doets, "Theoretical Modeling of a Robust Audio Fingerprinting System," Tech. Rep. Deift Univ. Technol., Deift, The Netherlands, 2004 (4 pages).

Chinese Patent Office, "First Office Action", issued in connection with Chinese Patent Application No. 200880128616.X, Jan. 4, 2012, (6 pages).

European Patent Office, "Appeal File History," issued in connection with European Application No. 02076018.7-2223/1261155, Appeal No. T1118/10-3503, on Aug. 13, 2010, (518 pages).

European Patent Office, "Complete File History," issued in connection with European Application No. 02076018.7-2223/1261155, Appeal No. T1118/10-3503, on Aug. 13, 2010, (1732 pages).

European Patent Office, "Examination Report", issued in connection with European patent application No. 08873178.1, Apr. 24, 2012, (3 pages).

European Patent Office, "Interlocutory Decision at Opposition," issued in connection with European Application No. 02076018.7-2223/1261155, Appeal No. T1118/10-3503, on Mar. 16, 2010, (14 pages).

European Patent Office, "Letter of Patent Proprietor" issued in connection with European Application No. 02076018.7-2223/1261155, Appeal No. T1118/10-3503, written on Dec. 16, 2010, (2 pages).

European Patent Office, "Notice of Deadline for Telecontrol Response" issued in connection with European Application No. 02076018.7-2223/1261155, Appeal No. T1118/10-3503, on Aug. 13, 2010, (4 pages).

Great Britian, "Notification of Grant" issued in connection with Great Britain Patent Application Serial No. GB0915239.8, mailed on Sep. 28, 2010 (2 pages).

European Patent Office, "Opposition File History," issued in connection with European Application No. 02076018.7-2223/1261155, Appeal No. T1118/10-3503, on Mar. 16, 2010, (546 pages).

European Patent Office, "Summons to Attend Oral Proceedings" issued in connection with European Application No. 02076018.7-2223/1261155, Appeal No. T1118/10-3503, on Jul. 10, 2009, (4 pages).

European Patent Office, "Supplmental European Search Report," issued in connection with European Application No. 93910942, Oct. 31, 1996, (27 pages).

European Patent Office, "Telecontrol Request for Opposition" issued in connection with European Application No. 02076018.7-2223/1261155, Appeal No. T1118/10-3503, on Dec. 24, 2007, (46 pages).

International Bureau, "International Search Report," issued in connection with International Application No. PCT/US2008/061783, Jan. 29, 2009 (4 pages).

International Bureau, "Written Opinion," issued in connection with International Application No. PCT/US2008/061783, Jan. 29, 2009 (7 pages).

Lieck, Hans-Peter, "Arbitron Filing Prior to Oral Proceedings," Boeters & Lieck European Patent and Trademark Attorneys, written in connection with European Application No. 02076018.7-2223/1261155, Appeal No. T1118/10-3503, Dec. 30, 2009, (18 pages).

Lieck, Hans-Peter, "Arbitron Response to Opposition," Boeters & Lieck European Patent and Trademark Attorneys, written in connection with European Application No. 02076018.7-2223/1261155, Appeal No. T1118/10-3503, Nov. 17, 2008, (18 pages).

Markus, Alexander, "Letter Relating to Appeal Procedure," Berne Patent Attorneys, written in connection with European Application No. 02076018.7-2223/1261155, Appeal No. T1118/10-3503, Dec. 17, 2010, (23 pages).

Storzbach, Michael, "Telecontrol Response," AMMANN Patent Attorneys Limited, Berne, written in connection with European Application No. 02076018.7-2223/1261155, Appeal No. T1118/10-3503, Feb. 18, 2009, (8 pages).

Tucker, Nigel Paul, "Arbitron Appeal," Boult Wade Tennant Patent Attorneys, written in connection with European Application No. 02076018.7-2223/1261155, Appeal No. T1118/10-3503, Jul. 26, 2010, (35 pages).

Tucker, Nigel Paul, "Letter Relating to Appeal Procedure," Boult Wade Tennant Patent Attorneys, written in connection with European Application No. 02076018.7-2223/1261155, Appeal No. T1118/10-3503, Dec. 22, 2010, (13 pages).

Chinese Patent Office, "First Office Action", issued in connection with Chinese Patent Application No. 2008800128440, Sep. 2, 2010, (4 pages).

Chinese Patent Office, "Second Office Action", issued in connection with Chinese Patent Application No. 2008800128440, Jan. 11, 2012, (1 pages).

Chinese Patent Office, "Third Office Action", issued in connection with Chinese Patent Application No. 2008800128440, Aug. 1, 2012, (5 pages).

Chinese Patent Office, "Notice of Allowance", issued in connection with Chinese Patent Application No. 201010145733.6, Nov. 5, 2012, (3 pages).

US 8,458,737 B2

METHODS AND APPARATUS FOR GENERATING SIGNATURES

RELATED APPLICATIONS

This patent claims the benefit of U.S. Provisional Patent Application No. 60/915,529, filed on May 2, 2007. The entire contents of the above-identified provisional patent application are hereby expressly incorporated herein by reference.

FIELD OF THE DISCLOSURE

The present disclosure relates generally to media monitoring and, more particularly, to methods and apparatus for generating signatures for use in identifying media information.

BACKGROUND

Identifying media information and more specifically audio streams (e.g., audio information) using signature matching techniques is well known. Known signature matching techniques are often used in television and radio audience metering applications and are implemented using several methods for generating and matching signatures. For example, in television audience metering applications, signatures are generated at monitoring sites (e.g., monitored households) and reference sites. Monitoring sites typically include locations such as, for example, households where the media consumption of audience members is monitored. For example, at a monitoring site, monitored signatures may be generated based on audio streams associated with a selected channel, radio station, etc. The monitored signatures may then be sent to a central data collection facility for analysis. At a reference site, signatures, typically referred to as reference signatures, are generated based on known programs that are provided within a broadcast region. The reference signatures may be stored at the reference site and/or a central data collection facility and compared with monitored signatures generated at monitoring sites. A monitored signature may be found to match with a reference signature and the known program corresponding to the matching reference signature may be identified as the program that was presented at the monitoring site.

DETAILED DESCRIPTION

Figure 1A:
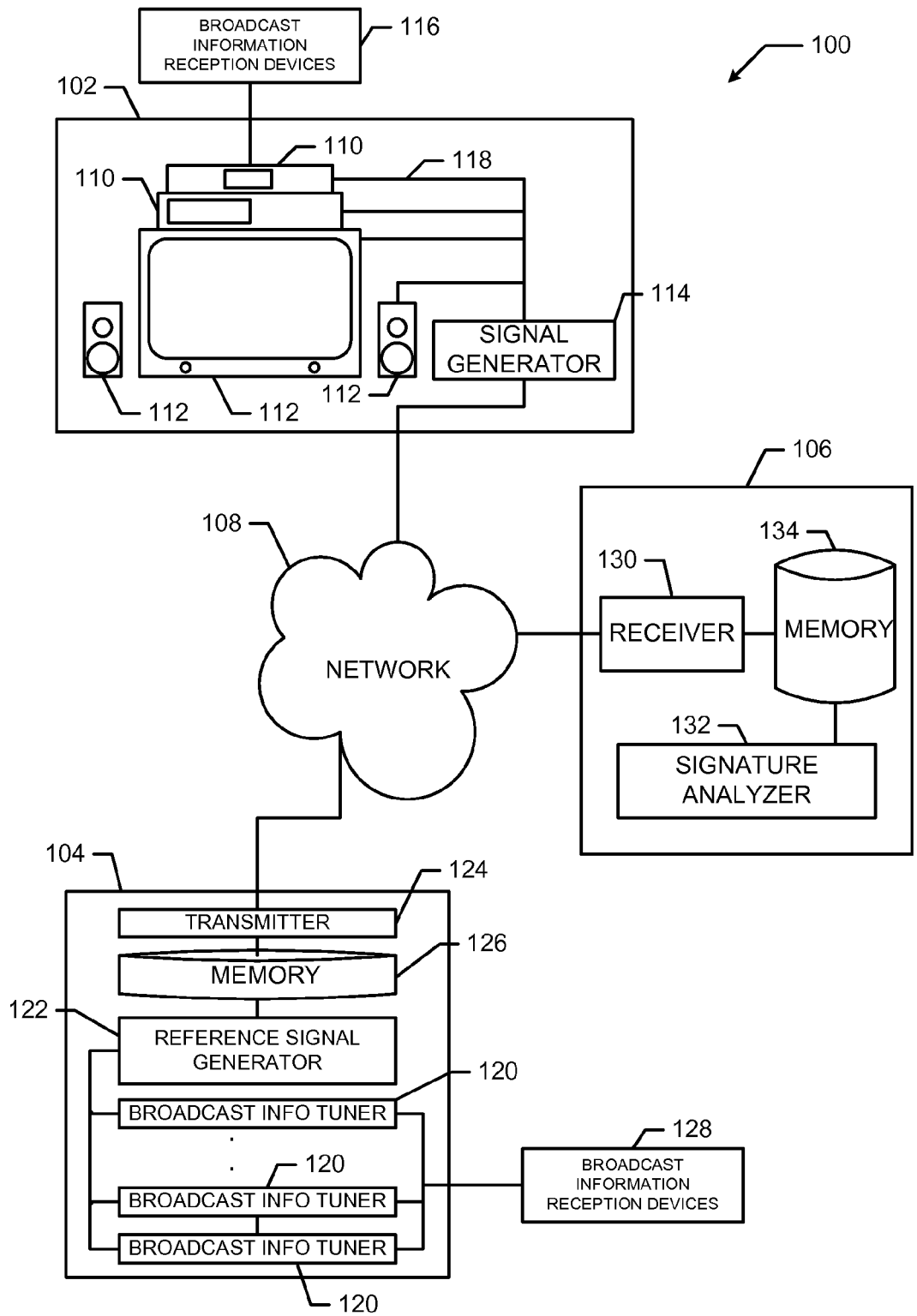
FIGS. 1A and 1B illustrate example audio stream identification systems for generating digital spectral signatures and identifying audio streams.

Although the following discloses example systems including, among other components, software executed on hardware, it should be noted that such systems are merely illustrative and should not be considered as limiting. For example, it is contemplated that any or all of these hardware and software components could be embodied exclusively in hardware, exclusively in software, or in any combination of hardware and software. Accordingly, while the following describes example systems, persons of ordinary skill in the art will readily appreciate that the examples provided are not the only way to implement such systems.

The methods and apparatus described herein generally relate to generating digital spectral signatures, which may be used to identify media information. A spectral signature is an audio descriptor that can accurately characterize audio signals for the purpose of matching, indexing, or database retrieval. In particular, the disclosed methods and apparatus are described with respect to generating digital spectral signatures based on audio streams (e.g., audio information). However, the methods and apparatus described herein may also be used to generate digital spectral signatures based on any other type of media information such as, for example, video information, web pages, still images, computer data, etc. Further, the media information may be associated with broadcast information (e.g., television information, radio information, etc.), information reproduced from any storage medium (e.g., compact discs (CD), digital versatile discs (DVD), etc.), or any other information that is associated with an audio stream, a video stream, or any other media information for which the digital spectral signatures are generated. In one particular example, the audio streams are identified based on digital spectral signatures that include monitored digital signatures generated at a monitoring site (e.g., a monitored household) and reference digital signatures generated and/or stored at a reference site and/or a central data collection facility.

As described in detail below, the methods and apparatus described herein identify media information including audio streams based on digital spectral signatures. The digital spectral signatures may be formed using energies from different bands of the spectrum of the audio stream being processed. These energies may be compared both between different frequency bands and across time to develop values that are used to create signature bits representing the audio stream during a particular period of time.

Frequency components of an audio signal are typically obtained by transforming the audio signal data (e.g., an audio stream) from the time domain to the frequency domain using, for example, a discrete Fourier transformation (DFT) or any other suitable transform, be it based on a Fourier Transform or not. The Fourier Transform can be used to analyze the frequency components in an audio signal and identify the spectral power of each frequency component. The spectral powers may then be used to generate digital spectral signatures.

Digital spectral signatures may also be generated based on wavelet transforms which transform audio data from the time domain to the wavelet domain. In general, wavelet transforms may be used to decompose blocks or frames of data (e.g., time domain audio samples) into multiple sub-bands, thereby allowing data sets to be analyzed at various scales and/or resolutions. By separating data into multiple sub-bands, a wavelet transform may be used to analyze each time interval of data at a desired scale or resolution.

Monitored signatures may be generated at a monitoring site based on audio streams associated with media information (e.g., a monitored audio stream) that is consumed by an audience. For example, a monitored signature may be generated based on the audio track of a television program presented at a monitoring site. The monitored signature may then be communicated to a central data collection facility for comparison to one or more reference signatures.

Reference signatures are generated at a reference site and/or a central data collection facility based on audio streams associated with known media information. The known media information may include media that is broadcast within a region, media that is reproduced within a household, media that is received via the internet, etc. Each reference signature is stored in a memory with media identification information such as, for example, a song title, a movie title, broadcast time, unique content source identification, etc. When a monitored signature is received at the central data collection facility, the monitored signature is compared with one or more reference signatures until a match is found. This match information may then be used to identify the media information (e.g., monitored audio stream) from which the monitored signature was generated. For example, a look-up table or a database may be referenced to retrieve a media title, a program identity, an episode number, airing time, etc. that corresponds to the media information from which the monitored signature was generated.

In one example, the rates at which monitored signatures and reference signatures are generated may be different. For example, for processing and other concerns, a monitored signature may be 25% of the data rate of a reference signature. For example, a 48-bit reference signature may be generated every 0.032 seconds, which results in a reference data rate of 48 bits/0.032 seconds or 187.5 bytes/second. In such an arrangement, a 48-bit monitored signature may be generated every 0.128 seconds, which results in a monitored data rate of 48 bits/0.128 seconds or 46.875 bytes/second. Of course, in an arrangement in which the data rates of the monitored and reference signatures differ, this difference must be accounted for when comparing monitored signatures with reference signatures. For example, if the monitoring rate is 25% of the reference rate, each consecutive monitored signature will correspond to every fourth reference signature.

Figure 1B:
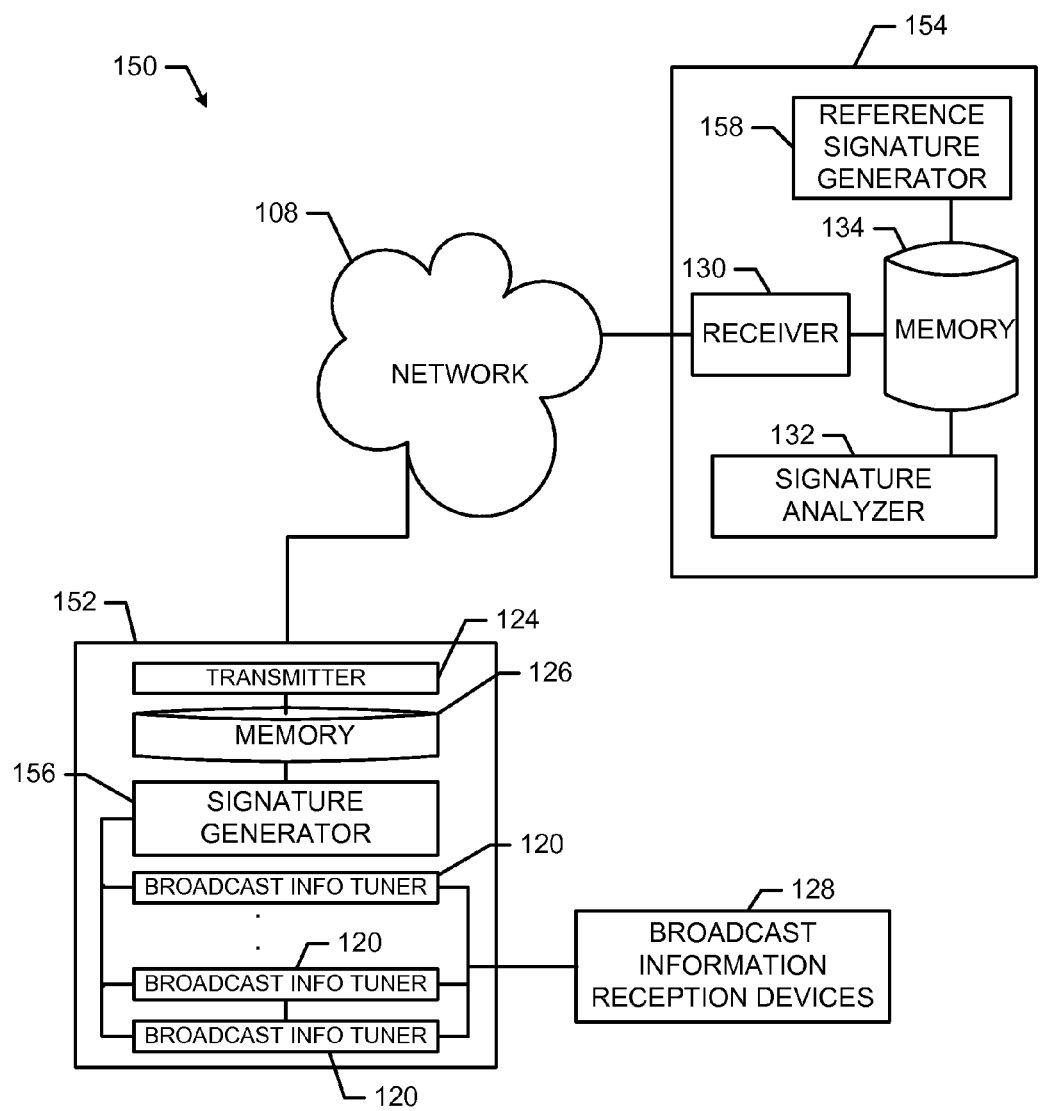

FIGS. 1A and 1B illustrate example audio stream identification systems 100 and 150 for generating digital spectral signatures and identifying audio streams. The example audio stream identification systems 100 and 150 may be implemented as a television broadcast information identification system and a radio broadcast information identification system, respectively. The example audio stream identification system 100 includes a monitoring site 102 (e.g., a monitored household), a reference site 104, and a central information processing facility 106.

Monitoring television broadcast information involves generating monitored signatures at the monitoring site 102 based on the audio data of television broadcast information and communicating the monitored signatures to the central information processing facility 106 via a network 108. Reference signatures may be generated at the reference site 104 and may also be communicated to the central information processing facility 106 via the network 108. The audio content represented by a monitored signature that is generated at the monitoring site 102 may be identified at the central information processing facility 106 by comparing the monitored signature to one or more reference signatures until a match is found. Alternatively, monitored signatures may be communicated from the monitoring site 102 to the reference site 104 and compared one or more reference signatures at the reference site 104. In another example, the reference signatures may be communicated to the monitoring site 102 and compared with the monitored signatures at the monitoring site 102.

The monitoring site 102 may be, for example, a household for which the media consumption of an audience is monitored. In general, the monitoring site 102 may include a plurality of media delivery devices 110, a plurality of media presentation devices 112, and a signature generator 114 that is used to generate monitored signatures associated with media presented at the monitoring site 102.

The plurality of media delivery devices 110 may include, for example, set top box tuners (e.g., cable tuners, satellite tuners, etc.), DVD players, CD players, radios, personal computers, etc. Some or all of the media delivery devices 110 such as, for example, set top box tuners may be communicatively coupled to one or more broadcast information reception devices 116, which may include a cable, a satellite dish, an antenna, and/or any other suitable device for receiving broadcast information. The media delivery devices 110 may be configured to reproduce media information (e.g., audio information, video information, web pages, still images, etc.) based on, for example, broadcast information and/or stored information. Broadcast information may be obtained from the broadcast information reception devices 116 and stored information may be obtained from any information storage medium (e.g., a DVD, a CD, a tape, a hard drive, a flash memory card, etc.). The media delivery devices 110 are communicatively coupled to the media presentation devices 112 and configurable to communicate media information to the media presentation devices 112 for presentation. The media presentation devices 112 may include televisions having a display device and/or a set of speakers by which audience members consume, for example, broadcast television information, music, movies, etc.

The signature generator 114 may be used to generate monitored digital signatures based on audio information, as described in greater detail below. In particular, at the monitoring site 102, the signature generator 114 may be configured to generate monitored signatures based on monitored audio streams that are reproduced by the media delivery devices 110 and/or presented by the media presentation devices 112. The signature generator 114 may be communicatively coupled to the media delivery devices 110 and/or the media presentation devices 112 via an audio monitoring interface 118. In this manner, the signature generator 114 may obtain audio streams associated with media information that is reproduced by the media delivery devices 110 and/or presented by the media presentation devices 112. Additionally or alternatively, the signature generator 114 may be communicatively coupled to microphones (not shown) that are placed in proximity to the media presentation devices 112 to detect audio streams. The signature generator 114 may also be communicatively coupled to the central information processing facility 106 via the network 108.

The network 108 may be used to communicate signatures (e.g., digital spectral signatures), control information, and/or configuration information between the monitoring site 102, the reference site 104, and the central information processing facility 106. Any wired or wireless communication system such as, for example, a broadband cable network, a DSL network, a cellular telephone network, a satellite network, and/or any other communication network may be used to implement the network 108.

As shown in FIG. 1A, the reference site 104 may include a plurality of broadcast information tuners 120, a reference signature generator 122, a transmitter 124, a database or memory 126, and broadcast information reception devices 128. The reference signature generator 122 and the transmitter 124 may be communicatively coupled to the memory 126 to store reference signatures therein and/or to retrieve stored reference signatures therefrom.

The broadcast information tuners 120 may be communicatively coupled to the broadcast information reception devices 128, which may include a cable, an antenna, a satellite dish, and/or any other suitable device for receiving broadcast information. Each of the broadcast information tuners 120 may be configured to tune to a particular broadcast channel. In general, the number of tuners at the reference site 104 is equal to the number of channels available in a particular broadcast region. In this manner, reference signatures may be generated for all of the media information transmitted over all of the channels in a broadcast region. The audio portion of the tuned media information may be communicated from the broadcast information tuners 120 to the reference signature generator 122.

The reference signature generator 122 may be configured to obtain the audio portion of all of the media information that is available in a particular broadcast region. The reference signature generator 122 may then generate a plurality of reference signatures (as described in greater detail below) based on the audio information and store the reference signatures in the memory 126. Although one reference signature generator is shown in FIG. 1, a plurality of reference signature generators may be used in the reference site 104. For example, each of the plurality of signature generators may be communicatively coupled to a respective one of the broadcast information tuners 120.

The transmitter 124 may be communicatively coupled to the memory 126 and configured to retrieve signatures therefrom and communicate the reference signatures to the central information processing facility 106 via the network 108.

The central information processing facility 106 may be configured to compare monitored signatures received from the monitoring site 102 to reference signatures received from the reference site 104. In addition, the central information processing facility 106 may be configured to identify monitored audio streams by matching monitored signatures to reference signatures and using the matching information to retrieve television program identification information (e.g., program title, broadcast time, broadcast channel, etc.) from a database. The central information processing facility 106 includes a receiver 130, a signature analyzer 132, and a memory 134, all of which are communicatively coupled as shown.

The receiver 130 may be configured to receive monitored signatures and reference signatures via the network 108. The receiver 130 is communicatively coupled to the memory 134 and configured to store the monitored signatures and the reference signatures therein.

The signature analyzer 132 may be used to compare reference signatures to monitored signatures. The comparisons carried out by the signature analyzer 132 may include searching for monitored signatures within reference signatures and/or identifying some or all monitored signatures within the reference signatures. Additionally, in some examples, the signature analyzer 132 can match a reference signature against itself (i.e., can compare against itself) in order to find repeat content, such as, for example, all of the same commercial occurrences, all multicasts, replays, etc. Further, the signature analyzer 132 can match monitored signatures against monitored signatures taken for the same or other reasons.

The signature analyzer 132 is communicatively coupled to the memory 134 and configured to retrieve the monitored signatures and the reference signatures from the same. The signature analyzer 132 may be configured to retrieve reference signatures and monitored signatures from the memory 134 and compare the monitored signatures to the reference signatures until a match is found. The memory 134 may be implemented using any machine accessible information storage medium such as, for example, one or more hard drives, one or more optical storage devices, etc.

Although the signature analyzer 132 is located at the central information processing facility 106 in FIG. 1A, the signature analyzer 132 may instead be located at the reference site 104. In such a configuration, the monitored signatures may be communicated from the monitoring site 102 to the reference site 104 via the network 108. Alternatively, the memory 134 may be located at the monitoring site 102 and reference signatures may be added periodically to the memory 134 via the network 108 by transmitter 124. Additionally, although the signature analyzer 132 is shown as a separate device from the signature generators 114 and 122, the signature analyzer 132 may be integral with the reference signature generator 122 and/or the signature generator 114. Still further, although FIG. 1 depicts a single monitoring site (i.e., the monitoring site 102) and a single reference site (i.e., the reference site 104), multiple such sites may be coupled via the network 108 to the central information processing facility 106.

The audio stream identification system 150 of FIG. 1B may be configured to monitor and identify audio streams associated with radio broadcast information. In general, the audio stream identification system 150 is used to monitor the content that is broadcast by a plurality of radio stations in a particular broadcast region. Unlike the audio stream identification system 100 used to monitor television content consumed by an audience, the audio stream identification system 150 may be used to monitor music, songs, advertisements, etc. that are broadcast within a broadcast region and the number of times that they are broadcast. This type of media tracking may be used to determine royalty payments, proper use of copyrights, etc. associated with each audio composition. The audio stream identification system 150 includes a monitoring site 152, a central information processing facility 154, and the network 108.

The monitoring site 152 is configured to receive all radio broadcast information that is available in a particular broadcast region and generate monitored signatures based on the radio broadcast information. The monitoring site 152 includes the plurality of broadcast information tuners 120, the transmitter 124, the memory 126, and the broadcast information reception devices 128, all of which are described above in connection with FIG. 1A. In addition, the monitoring site 152 includes a signature generator 156. When used in the audio stream identification system 150, the broadcast information reception devices 128 are configured to receive radio broadcast information and the broadcast information tuners 120 are configured to tune to the radio broadcast stations. The number of broadcast information tuners 120 at the monitoring site 152 may be equal to the number of radio broadcasting stations in a particular broadcast region.

The signature generator 156 is configured to receive the tuned to audio information from each of the broadcast information tuners 120 and generate monitored signatures for the same. Although one signature generator is shown (i.e., the signature generator 156), the monitoring site 152 may include multiple signature generators, each of which may be communicatively coupled to one of the broadcast information tuners 120. The signature generator 156 may store the monitored signatures in the memory 126. The transmitter 124 may retrieve the monitored signatures from the memory 126 and communicate them to the central data collection facility 154 via the network 108.

The central information processing facility 154 is configured to receive monitored signatures from the monitoring site 152, generate reference signatures based on reference audio streams, and compare the monitored signatures to the reference signatures. The central information processing facility 154 includes the receiver 130, the signature analyzer 132, and the memory 134, all of which are described in greater detail above in connection with FIG. 1A. In addition, the central information processing facility 154 includes a reference signature generator 158.

The reference signature generator 158 is configured to generate reference signatures based on reference audio streams. The reference audio streams may be stored on any type of machine accessible medium such as, for example, a CD, a DVD, a digital audio tape (DAT), etc. In general, artists and/or record producing companies or other media content owners send their audio works (i.e., music, songs, etc.) to the central information processing facility 154 to be added to a reference library. The reference signature generator 158 may read the audio data from the machine accessible medium and generate a plurality of reference signatures based on each audio work (e.g., the captured audio 300 of FIG. 3). The reference signature generator 158 may then store the reference signatures in the memory 134 for subsequent retrieval by the signature analyzer 132. Identification information (e.g., song title, artist name, track number, etc.) associated with each reference audio stream may be stored in a database and may be indexed based on the reference signatures. In this manner, the central information processing facility 154 includes a database of reference signatures and identification information corresponding to all known and available song titles.

The receiver 130 is configured to receive monitored signatures from the network 108 and store the monitored signatures in the memory 134. The monitored signatures and the reference signatures are retrieved from the memory 134 by the signature analyzer 132 for use in identifying the monitored audio streams broadcast within a broadcast region. As noted above, the signature analyzer 132 may be used to compare reference signatures to monitored signatures. The comparisons carried out by the signature analyzer 132 may include searching for monitored signatures within reference signatures and/or identifying some or all monitored signatures within the reference signatures. Additionally, in some examples, the signature analyzer 132 can match a reference signature against itself (i.e., can compare against itself) in order to find repeat content, such as, for example, all of the same commercial occurrences, all multicasts, replays, etc. Further, the signature analyzer 132 can match monitored signatures against monitored signatures taken for the same or other reasons. Thus, the signature analyzer 132 may identify the monitored audio streams by first matching a monitored signature to a reference signature. The match information and/or the matching reference signature are then used to retrieve identification information (e.g., a song title, a song track, an artist, etc.) from a database stored in the memory 134.

Although one monitoring site (e.g., the monitoring site 152) is shown in FIG. 1B, multiple monitoring sites may be communicatively coupled to the network 108 and configured to generate monitored signatures. In particular, each monitoring site may be located in a respective broadcast region and configured to monitor the content of the broadcast stations within a respective broadcast region.

Figure 2:
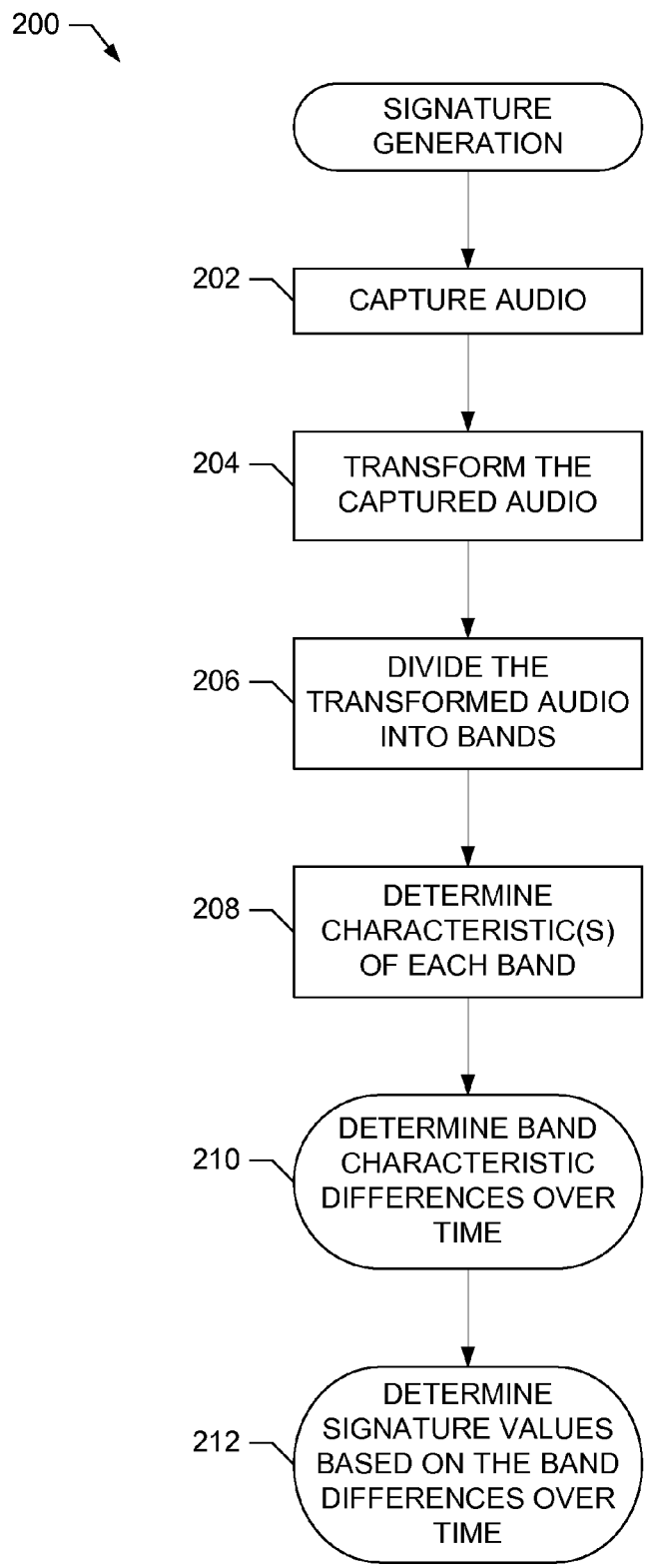
FIG. 2 is a flow diagram illustrating an example signature generation process.
Figure 3:
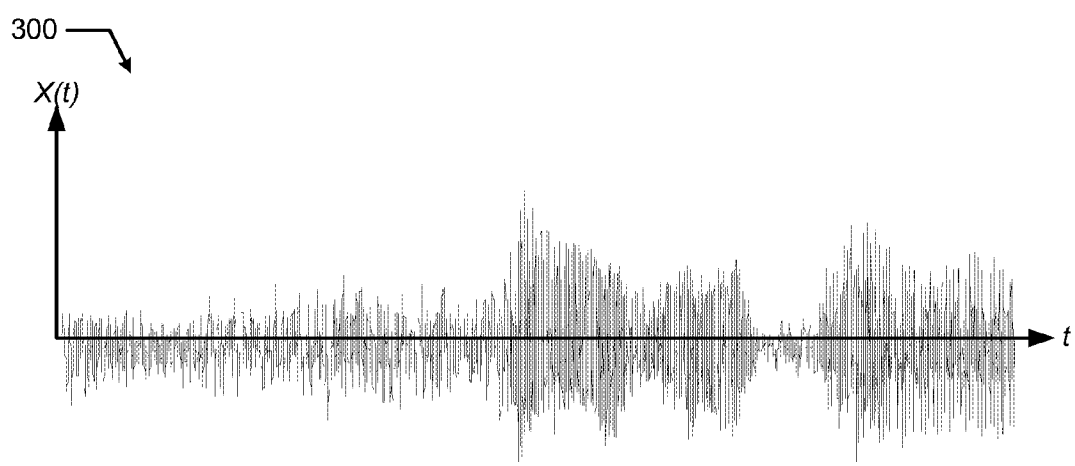
FIG. 3 is a time-domain representation of an example monitored audio stream.

FIG. 2 is a flow diagram representing an example signature generation process 200. As shown in FIG. 2, the signature generation process 200 first captures audio that is to be characterized by a signature (block 202). An example time domain plot of captured audio is shown in FIG. 3 at reference numeral 300. The audio may be captured from an audio source, such as, for example a hardwired connection to an audio source or a microphone/wireless connection to an audio source. If the audio source is analog, the capturing includes digitizing/sampling the analog audio source using, for example, an analog-to-digital converter. In one example, the audio source may be sampled at a rate of 8 kilohertz (kHz), which is referred to as a sampling rate (Fs). This means that the analog audio is represented by digital samples thereof that are taken at the rate of eight thousand samples per second, or every 125 microseconds (µs). Each of the audio samples may be represented by 16 bits of resolution. If audio source contains more then one channel, e.g. stereo format having 2 channels of sound, or Dolby Digital© format having up to 6 channels, then multiple channels can be downconverted to a single channel prior to generating the signatures. Downconverting can be done by one of many well-known techniques. In some example, one can generate multiple signatures from more then one channel of sound concurrently.

In one example, a window of audio corresponding to 8192 samples is captured for processing. At the foregoing sampling rate, this corresponds to 1.024 seconds of audio. However, this is merely one example, and the number of samples that are collected may correspond to audio segments ranging anywhere from approximately 1 second to 2 seconds in duration. Generically, herein the number of captured samples of audio is referred to with the variable M. Thus, in the above example, M=8192 and the time range of audio captured corresponds to t . . . t+M/Fs.

After the samples have been captured (block 202), the process 200 transforms the captured audio (block 204). In one example, the transformation may be a transformation from the time domain into the frequency domain using a Discrete Fourier Transform (DFT). For example, the M real-valued samples of captured audio may be converted into an audio spectrum that is represented by M/2 complex-valued DFT coefficients.

Figure 4:
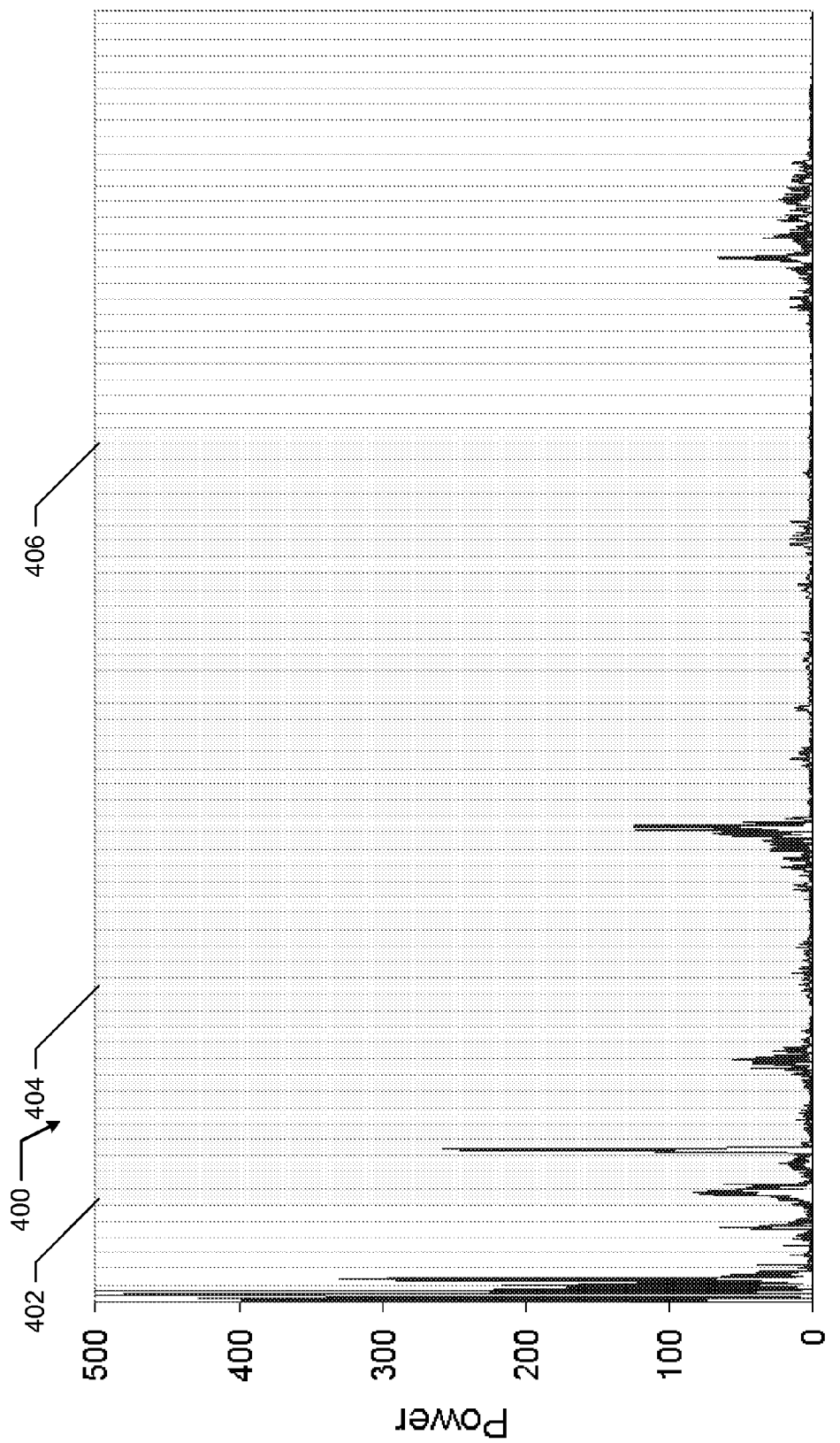
FIG. 4 is a frequency domain representation of an example monitored audio stream, wherein the spectrum of the example monitored audio stream is divided into frequency bands.

After the captured audio is transformed, for example, to the frequency domain, the transformed audio is divided into, for example, 48 non-overlapping frequency bands (block 206). As shown in FIG. 4, an audio spectrum 400 corresponding to the time domain audio signal 300 of FIG. 3 is shown as divided into a number of bands, three of which are referred to at reference numerals 402, 404, and 406. The selected bands, which are shown as shaded in FIG. 4, that lie between reference numerals 402 and 406 may cover only a portion of the audio spectrum and may be selected in any appropriate manner. In one example, the 48 bands may be defined in Table 1, below.

TABLE 1

| Band Index | Start Bin index | End Bin Index | Start Frequency, Hz | End Frequency, Hz |
|---|---|---|---|---|
| 1 | 254 | 285 | 247.5585938 | 278.8085938 |
| 2 | 286 | 317 | 278.8085938 | 310.0585938 |
| 3 | 318 | 349 | 310.0585938 | 341.3085938 |
| 4 | 350 | 381 | 341.3085938 | 372.5585938 |
| 5 | 382 | 413 | 372.5585938 | 403.8085938 |
| 6 | 414 | 445 | 403.8085938 | 435.0585938 |
| 7 | 446 | 477 | 435.0585938 | 466.3085938 |
| 8 | 478 | 509 | 466.3085938 | 497.5585938 |
| 9 | 510 | 541 | 497.5585938 | 528.8085938 |
| 10 | 542 | 573 | 528.8085938 | 560.0585938 |
| 11 | 574 | 605 | 560.0585938 | 591.3085938 |
| 12 | 606 | 637 | 591.3085938 | 622.5585938 |
| 13 | 638 | 669 | 622.5585938 | 653.8085938 |
| 14 | 670 | 701 | 653.8085938 | 685.0585938 |
| 15 | 702 | 733 | 685.0585938 | 716.3085938 |
| 16 | 734 | 765 | 716.3085938 | 747.5585938 |
| 17 | 766 | 797 | 747.5585938 | 778.8085938 |
| 18 | 798 | 829 | 778.8085938 | 810.0585938 |
| 19 | 830 | 861 | 810.0585938 | 841.3085938 |
| 20 | 862 | 893 | 841.3085938 | 872.5585938 |
| 21 | 894 | 925 | 872.5585938 | 903.8085938 |
| 22 | 926 | 957 | 903.8085938 | 935.0585938 |
| 23 | 958 | 989 | 935.0585938 | 966.3085938 |
| 24 | 990 | 1021 | 966.3085938 | 997.5585938 |
| 25 | 1022 | 1053 | 997.5585938 | 1028.808594 |
| 26 | 1054 | 1085 | 1028.808594 | 1060.058594 |
| 27 | 1086 | 1117 | 1060.058594 | 1091.308594 |
| 28 | 1118 | 1149 | 1091.308594 | 1122.558594 |
| 29 | 1150 | 1181 | 1122.558594 | 1153.808594 |
| 30 | 1182 | 1213 | 1153.808594 | 1185.058594 |
| 31 | 1214 | 1245 | 1185.058594 | 1216.308594 |
| 32 | 1246 | 1277 | 1216.308594 | 1247.558594 |
| 33 | 1278 | 1309 | 1247.558594 | 1278.808594 |
| 34 | 1310 | 1341 | 1278.808594 | 1310.058594 |
| 35 | 1342 | 1373 | 1310.058594 | 1341.308594 |
| 36 | 1374 | 1405 | 1341.308594 | 1372.558594 |
| 37 | 1406 | 1437 | 1372.558594 | 1403.808594 |
| 38 | 1438 | 1469 | 1403.808594 | 1435.058594 |
| 39 | 1470 | 1501 | 1435.058594 | 1466.308594 |
| 40 | 1502 | 1533 | 1466.308594 | 1497.558594 |
| 41 | 1534 | 1565 | 1497.558594 | 1528.808594 |
| 42 | 1566 | 1597 | 1528.808594 | 1560.058594 |
| 43 | 1598 | 1629 | 1560.058594 | 1591.308594 |
| 44 | 1630 | 1661 | 1591.308594 | 1622.558594 |
| 45 | 1662 | 1693 | 1622.558594 | 1653.808594 |
| 46 | 1694 | 1725 | 1653.808594 | 1685.058594 |
| 47 | 1726 | 1757 | 1685.058594 | 1716.308594 |
| 48 | 1758 | 1789 | 1716.308594 | 1747.558594 |

Subsequently, the process 200 determines characteristics for each spectral band (block 208). The characteristics may be any range of characteristics, such as amplitude, energy, or the like. In one particular example, the characteristic is energy within each of the bands, which results in 48 real values: $E_1^t$, $E_2^t$, $E_3^t$, ..., $E_{48}^t$, representing the energy in each of the 48 bands at time t.

After the band energies are determined (block 208), the process 200 determines band characteristic differences over time (block 210). The determination of band characteristic differences over time may include various comparisons of band energies with bands at different times or may include comparisons of band energies across bands at different times. Further detail regarding one example technique for determining band characteristic differences over time is provided below in conjunction with FIG. 5.

Based on the characteristic differences over time (block 210), the process 200 determines signature values (block 212). One example process for determining signature values from band characteristic differences is described below in conjunction with FIG. 6. In general, various tests or comparisons can be performed on the characteristic differences and from those comparisons, bits may be selected to represent/characterize the captured audio. In one example, comparisons on the 48 different bands will ultimately end up resulting in 48 different signature bits representative of the captured audio.

As noted above, FIG. 5 shows one example process 210 to determine band characteristic differences over time. As described above, the point at which the process 210 operates in when the band energies (e.g., the 48 different band energies) have been calculated. When the process begins, a counter is initialized to a starting condition, such as for example reset to a count of 1 (block 502). The process 210 then determines if the current count (i.e., the value of i) is an odd number (block 504).

If the count is an odd number, a characteristic difference $d_i = E_i^t - E_{i+1}^T$ is determined (block 506). With regard to nomenclature, $E_i^t$ represents the energy in band i at time t and $E_{i+1}^T$ represents the energy in band i+1 at time T. Time t is the present and time T is in the past, i.e. T=t−Δt. In one example, the time interval Δt is an integer multiple of 256 samples, e.g. Δt=(32*256/Fs) sec. In general, the value of Δt can be arbitrary and chosen differently for different bands. For example, Δt values can be set as following: Δt=512 ms for bands with index i=1, 4, 7, ..., Δt=768 ms for bands with index i=2, 5, 8, ..., Δt=1024 ms for bands with index i=3, 6, 9 ... etc. Variations in the selection of Δt may increase the statistical independence between different bits of a signature, which enables the values of the signatures to be more uniformly distributed over all possible values.

Conversely, if i is an even number (block 504), the process 210 determines the characteristic difference $d_i = E_i^t - E_{i-1}^T$ (block 508). That is, the energy in a lower band at an earlier time is subtracted from the energy in a selected band at the present time.

After the characteristic differences have been calculated (blocks 506 and 508), the process determines if the last band has been reached in the spectrum (block 510). For example, if there are 48 bands in the spectrum, the process 210 will determine if the counter i has reached the value of 48.

If the last band has been reached (block 510), the process 210 ends and control returns to block 212 of FIG. 2. Alternatively, if the last band has not been reached (block 510), the process 210 increments the counter to select the next band (block 512) and the processing represented by blocks 504, 506, 508, and 510 is repeated.

Figure 5:
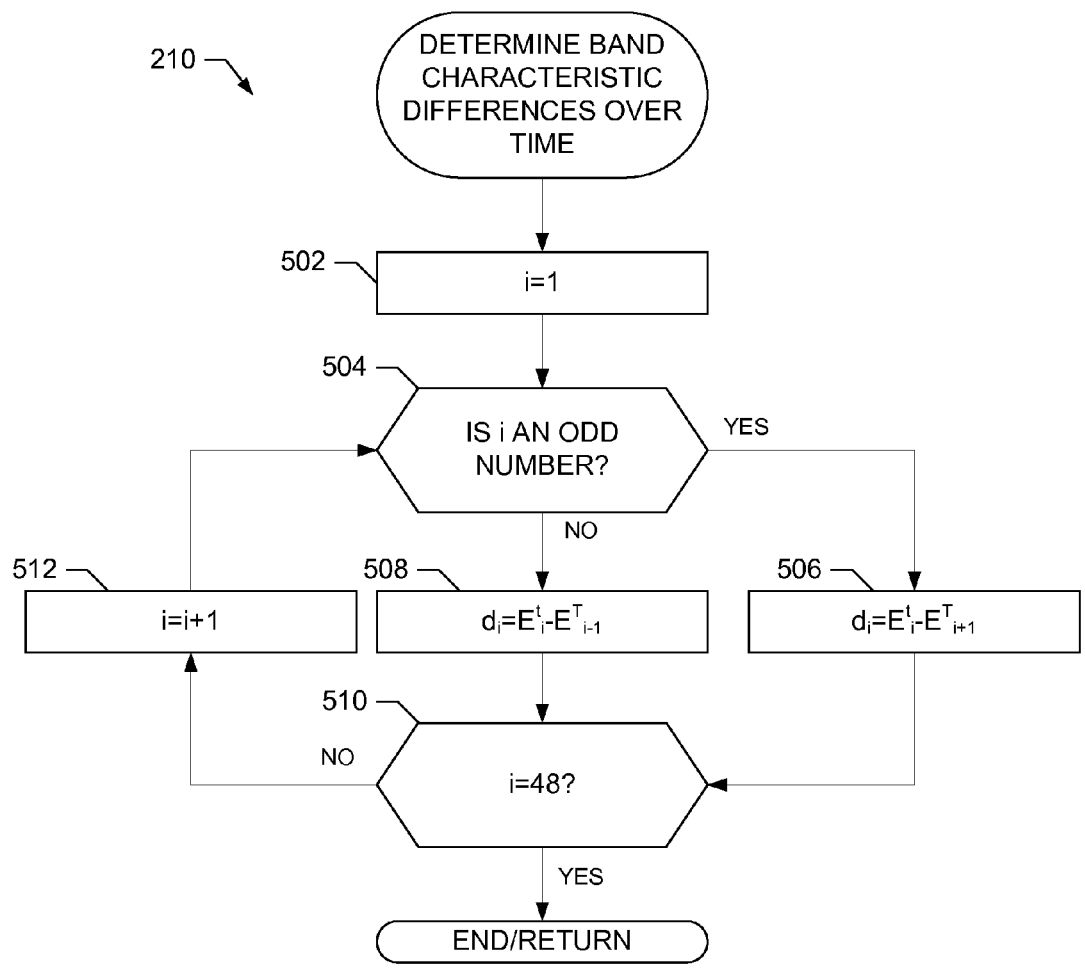
FIG. 5 is a flow diagram of one example way to implement the determine band characteristic differences over time process shown generally in FIG. 2.

After the characteristic differences have been determined (block 210), which may be performed as described in conjunction with FIG. 5, the signature values are determined. In one example implementation, the signature values may be determined according to a process 212, shown in FIG. 6.

Figure 6:
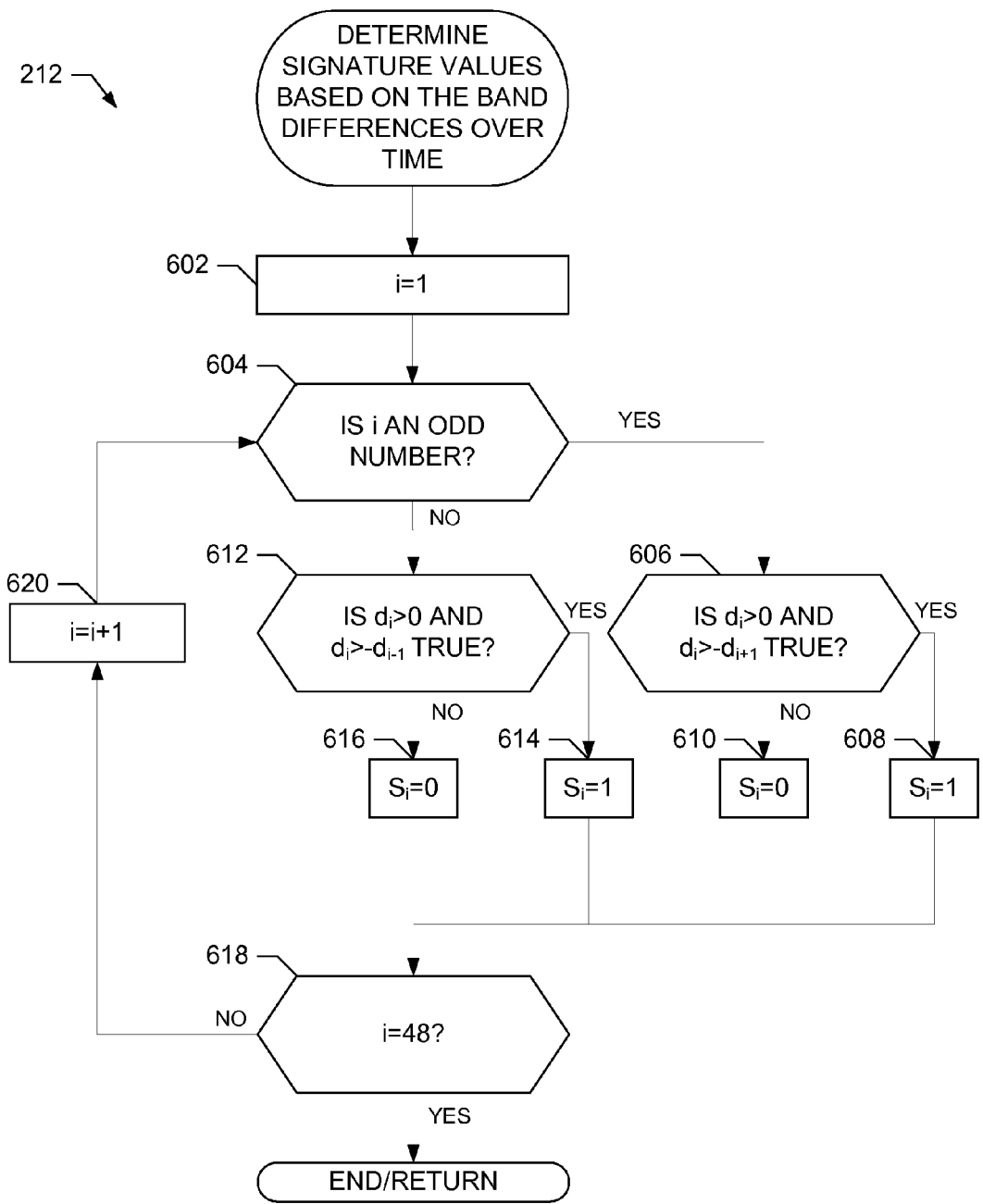
FIG. 6 is a flow diagram of one example way to implement the determine signature values based on the band differences over time process shown generally in FIG. 2.

The process 212 is initialized at block 602 of FIG. 6. The initialization may include any number of different items, but includes setting an index (i) to one. If i is an odd number (block 604), a test (block 606) including two evaluations is undertaken to determine whether the $i^{th}$ bit should be set to a logical one or a logical zero. In particular, the test includes determining if the characteristic difference for the $i^{th}$ band is positive (i.e., $d_i > 0$) and determining if the characteristic difference for the $i^{th}$ band is larger than the negative of the characteristic difference for the $(i+1)^{th}$ band (i.e., $d_i > -d_{i+1}$). If each of the evaluations is true, an $i^{th}$ signature bit is set to a logical one (block 608). Alternatively, if either of the evaluations is not true, the $i^{th}$ signature bit is set to a logical zero (block 610).

If, however, i is not an odd number (block 604), the process 212 performs a second test including two evaluations (block 612). In particular, the test (block 612) includes determining if the characteristic difference for the $i^{th}$ band is positive ($d_i>0$) and determining if the characteristic difference for the $i^{th}$ band is larger than the negative of the characteristic difference for the $(i-1)^{th}$ band ($d_i>-d_{i-1}$). If each of the evaluations is true, an $i^{th}$ signature bit is set to a logical one (block 614). Alternatively, if either of the evaluations is not true, the $i^{th}$ signature bit is set to a logical zero (block 616).

After the $i^{th}$ signature bit has been set (blocks 608, 610, 614, or 616), the process 212 determines if the last bit value has been calculated (block 618). For example, if there are 48 bits in a signature, the process 212 determines if the index i has been incremented to a value of 48 (block 618). If the last signature bit has been determined, the process 212 ends and returns control to its calling process. Alternatively, if the last signature bit has not been determined (block 618), the process 212 increments the index i (block 620) and the process 212 continues to execute from the block 604.

Figure 7:
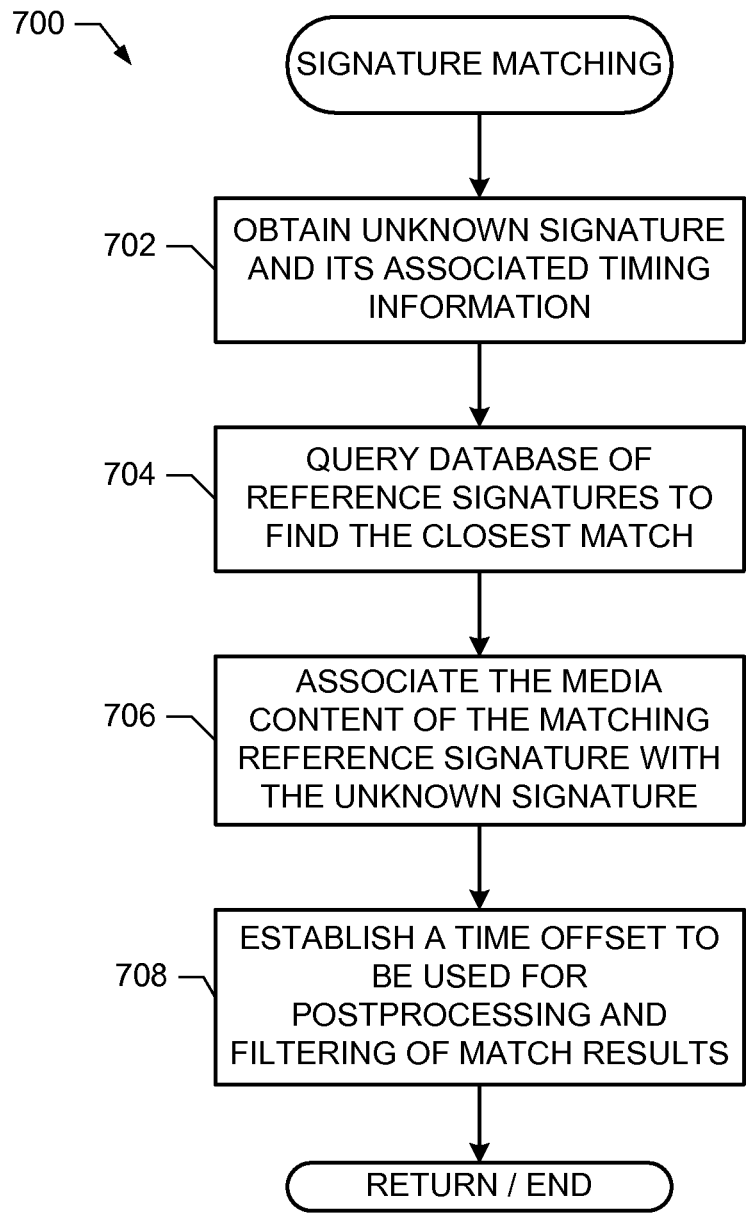
FIG. 7 is a flow diagram of an example signature matching process.

The foregoing has described signaturing techniques that may be carried out to determine signatures representative of a portion of captured audio. FIG. 7 shows one example signature matching process 700 that may be carried out to compare reference signatures (i.e., signatures determined at a reference site(s)) to monitored signatures (i.e., signatures determined at a monitoring site). The ultimate goal of signature matching is to find the closest match between a query audio signature (e.g., monitored audio) and signatures in a database (e.g., signatures taken based on reference audio). The comparison may be carried out at a reference site, a monitoring site, or any other data processing site having access to the monitored signatures and a database containing reference signatures.

Figure 8:
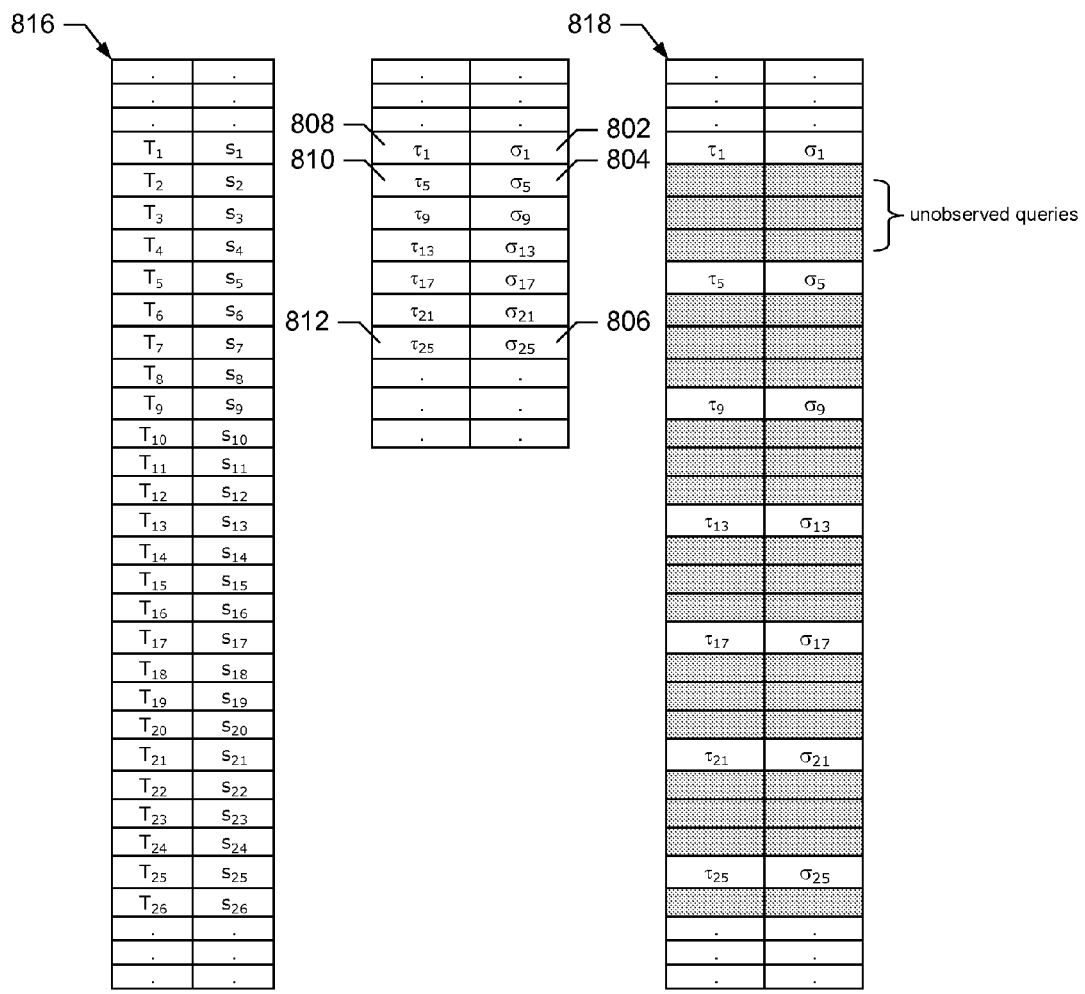
FIG. 8 is a diagram showing how signatures may be compared in accordance with the flow diagram of FIG. 7.

Now turning in detail to the example method of FIG. 7, the example process 700 involves obtaining a monitored signature and its associated timing (block 702). As shown in FIG. 8, a signature collection may include a number of monitored signatures, three of which are shown in FIG. 8 at reference numerals 802, 804 and 806. Each of the signatures is represented by a sigma (σ). Each of the monitored signatures 802, 804, 806 may include timing information 808, 810, 812, whether that timing information is implicit or explicit.

A query is then made to a database containing reference signatures (block 704) to identify the signature in the database having the closest match. In one implementation, the measure of similarity (closeness) between signatures is taken to be a Hamming distance, namely, the number of position at which the values of query and reference bit strings differ. In FIG. 8, a database of signatures and timing information is shown at reference numeral 816. Of course, the database 806 may include any number of different signatures from different media presentations. An association is then made between the audio and/or video program (i.e., media content) associated with the matching reference signature and the unknown signature (block 706).

The process 700 may then establish an offset between the monitored signature and the reference signature (block 708). This offset allows for tremendous improvement in distinguishing between the true positive matches and the false positive matches. False positive matches will occur with essentially random values of offsets, while the true positive matches will have a nearly constant offset value, due to local continuity of media consumption, i.e. viewing, monitoring, etc. Optionally, this offset is helpful because, as noted above, the monitored signatures may be less frequent than the reference signatures. For example, as shown in FIG. 8, the monitored signatures may be expanded 818 to match the timing of the reference signature database 816. In making this expansion is becomes clear that the monitored signature matches the reference signature every fourth time period. As will be readily appreciated by those having ordinary skill in the art, this matching may be only approximate because the perfect alignment between the blocks of audio samples used to compute the signatures is difficult to achieve. The spacing between signatures in the monitored signatures stream 818 is referred to as "unobserved". The use of the offset values is typically accomplished in the post-processing and filtering of match results obtained in 706.

The example methods, processes, and/or techniques described above may be implemented by hardware, software, and/or any combination thereof. More specifically, the example methods may be executed in hardware defined by the block diagrams of FIGS. 9 and 10. The example methods, processes, and/or techniques may also be implemented by software executed on a processor system such as, for example, the processor system 1110 of FIG. 11.

Figure 9:
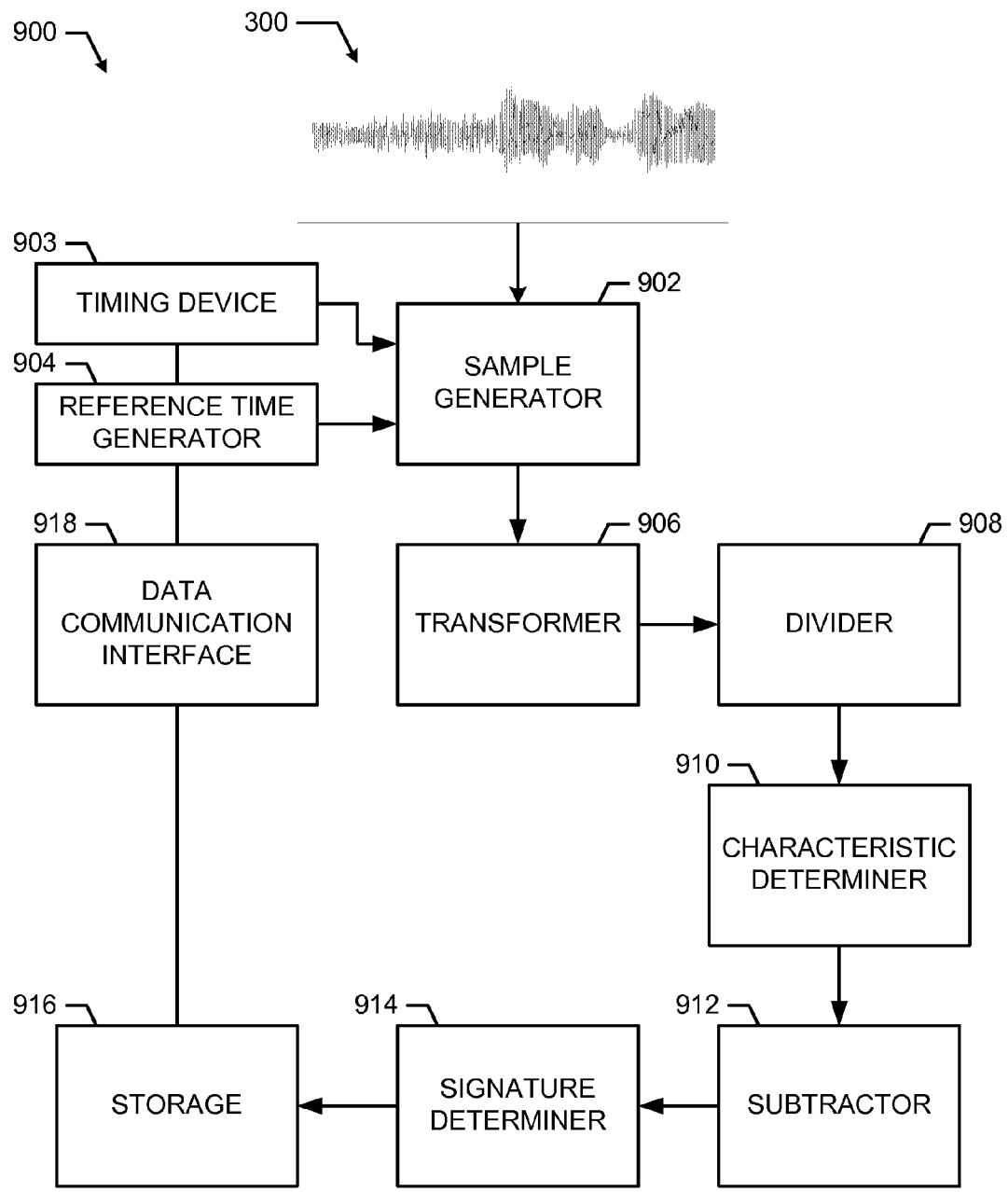
FIG. 9 is a block diagram of an example signature generation system for generating digital spectral signatures based on audio streams.

FIG. 9 is a block diagram of an example signature generation system 900 for generating digital spectral signatures. In particular, the example signature generation system 900 may be used to generate monitored signatures and/or reference signatures based on spectral energies and comparisons between spectral energies both in the present time and at other times in the past or in the future. For example, the example signature generation system 900 may be used to implement the signature generators 114 and 122 of FIG. 1A or the signature generators 156 and 158 of FIG. 1B. Additionally, the example signature generation system 900 may be used to implement the example methods of FIGS. 5 and 6.

As shown in FIG. 9, the example signature generation system 900 includes a sample generator 902, a timing device 903, a reference time generator 904, a transformer 906, a divider 908, a characteristic determiner 910, a subtractor 912, a signature generator 914, storage, and a data communication interface 918, all of which may be communicatively coupled as shown. The example signature generation system 900 may be configured to obtain an example audio stream, acquire a plurality of audio samples from the example audio stream, and generate digital spectral signatures based on the audio samples.

The sample generator 902 may be configured to obtain the example audio stream, such as a stream resulting in the captured audio 300 of FIG. 3. The stream 300 may be any analog or digital audio stream. If the example audio stream 920 is an analog audio stream, the sample generator 902 may be implemented using an analog-to-digital converter. Additionally, the sample generator 902 may be configured to acquire and/or extract audio samples at any desired sampling frequency $F_s$. For example, as described above, the sample generator may be configured to acquire M samples at 8 kHz and may use 16 bits to represent each sample. In such an arrangement, M may be any number of samples such as, for example, 8192. The sample generator 902 may also notify the reference time generator 904 when an audio sample acquisition process begins. The sample generator 902 communicates samples to the transformer 906.

The timing device 903 may be configured to generate time data and/or timestamp information and may be implemented by a clock, a timer, a counter, and/or any other suitable device. The timing device 903 may be communicatively coupled to the reference time generator 904 and may be configured to communicate time data and/or timestamps to the reference time generator 904. The timing device 903 may also be communicatively coupled to the sample generator 902 and may assert a start signal or interrupt to instruct the sample generator 902 to begin collecting or acquiring audio sample data. In one example, the timing device 903 may be implemented by a real-time clock having a 24-hour period that tracks time at a resolution of milliseconds. In this case, the timing device 903 may be configured to reset to zero at midnight and track time in milliseconds with respect to midnight. In another example, the timing device 903 may send timestamps directly to the signature determiner 914 so the time timestamps may be attached to signatures generated by the signature determiner 914, before storage of the signatures.

The reference time generator 904 may initialize a reference time to when a notification is received from the sample generator 902. The reference time to may be used to indicate the time within an audio stream at which a signature is generated. In particular, the reference time generator 904 may be configured to read time data and/or a timestamp value from the timing device 903 when notified of the beginning of a sample acquisition process by the sample generator 902. The reference time generator 904 may then store the timestamp value as the reference time $t_0$.

The transformer 906 may be configured to perform an M point DFT, wherein M is the number of samples obtained by the sample generator 902. For example, if the sample generator obtains 8192 real samples, the transformer will produce a spectrum from the samples wherein the spectrum is represented by 4096 complex Fourier coefficients.

The divider 908 may be configured to identify several frequency bands (e.g., 48 bands) within the DFT generated by the transformer 906. The selected bands may, but preferably do not overlap with one another. The bands may be selected according to any technique. In one example, the 48 bands are defined as explained above in conjunction with FIG. 2.

The characteristic determiner 910 may be configured to obtain characteristics representing the frequency spectrum in each of the 48 bands. For example, the characteristic determiner 910 may calculate the energy in each of the 48 bands. Alternatively, other characteristics such as amplitude, phase, etc. may be selected as characteristics of each of the bands.

As described above in connection with FIG. 5, the subtractor 912 determines the differences between characteristics of different frequency bands at different points in time. For example, the energy in neighboring bands may be compared to one another (e.g., subtracted). The nature of the bands and the timing of the energies that are compared may be dependent on whether the band under consideration is an odd numbered band or an even numbered band. For example, as described above, a comparison for an odd numbered band being considered may be $d_i = E'_i - E^T_{i+1}$, whereas a comparison for an even numbered band being considered may be $d_i = E'_i - E^T_{i-1}$.

The signature determiner 914 operates on the resulting values from the subtractor 912 to produce one signature bit for each of the 48 frequency bands. This operation may be very similar or identical to the process 212 described above in conjunction with FIG. 6. That is, the signature bit values may be based on whether an index is odd or even and whether certain comparisons of the difference values from the subtractor 912 are true. One example detail of the signature generation process is provided above in conjunction with FIG. 6. The signature bits are output to the storage 916.

The storage may be any suitable medium for accommodating signature storage. For example, the storage 916 may be a memory such as random access memory (RAM), flash memory, or the like. Additionally or alternatively, the storage 916 may be a mass memory such as a hard drive, an optical storage medium, a tape drive, or the like.

The storage 916 is coupled to the data communication interface 918. For example, if the system 900 is in a monitoring site (e.g., in a person's home) the signature information in the storage 916 may be communicated to a collection facility, a reference site, or the like, using the data communication interface 918.

Figure 10:
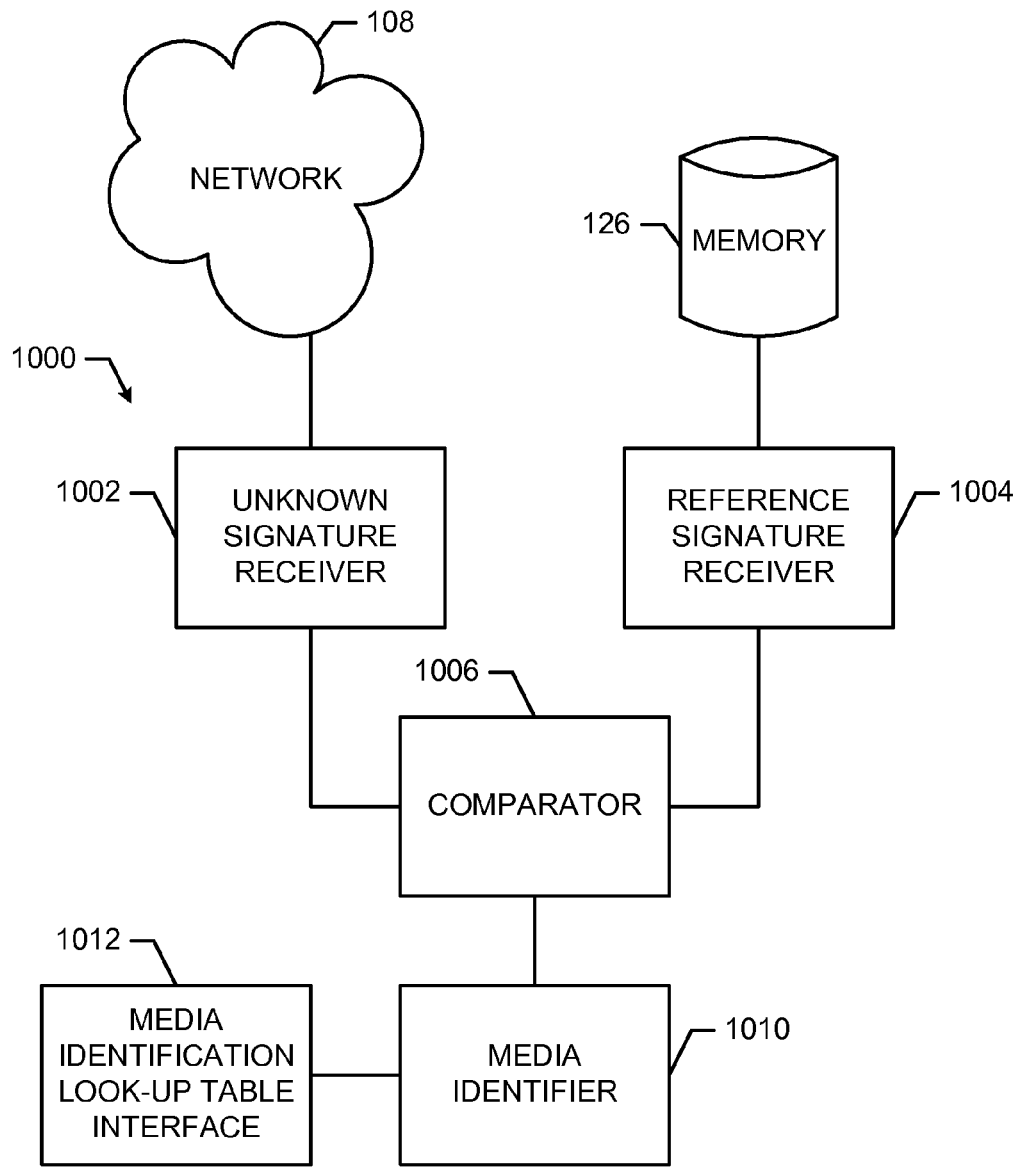
FIG. 10 is a block diagram of an example signature comparison system for comparing digital spectral signatures.

FIG. 10 is a block diagram of an example signature comparison system 1000 for comparing digital spectral signatures. In particular, the example signature comparison system 1000 may be used to compare monitored signatures with reference signatures. For example, the example signature comparison system 1000 may be used to implement the signature analyzer 132 of FIG. 1A to compare monitored signatures with reference signatures. Additionally, the example signature comparison system 1000 may be used to implement the example process of FIG. 7.

The example signature comparison system 1000 includes a monitored signature receiver 1002, a reference signature receiver 1004, a comparator 1006, a media identifier 1010, and a media identification look-up table interface 1012, all of which may be communicatively coupled as shown.

The monitored signature receiver 1002 may be configured to obtain monitored signatures via the network 108 (FIG. 1) and communicate the monitored signatures to the comparator 1006. The reference signature receiver 1004 may be configured to obtain reference signatures from the memory 134 (FIGS. 1A and 1B) and communicate the reference signatures to the comparator 1006.

The comparator 1006 may be configured to compare reference signatures to monitored signatures using any number of different techniques including, for example, hash matching, and the like. The comparator 1006 filters out non-matching reference signatures.

After a matching reference signature is found, the media identifier 1010 may obtain the matching reference signature and in cooperation with the media identification look-up table interface 1012 may identify the media information associated with an unidentified audio stream (e.g., the example monitored audio stream 300 of FIG. 3). For example, the media identification look-up table interface 1012 may be communicatively coupled to a media identification look-up table or a database that is used to cross-reference media identification information (e.g., movie title, show title, song title, artist name, episode number, etc.) based on reference signatures. In this manner, the media identifier 1010 may retrieve media identification information from the media identification database based on the matching reference signatures.

Figure 11:
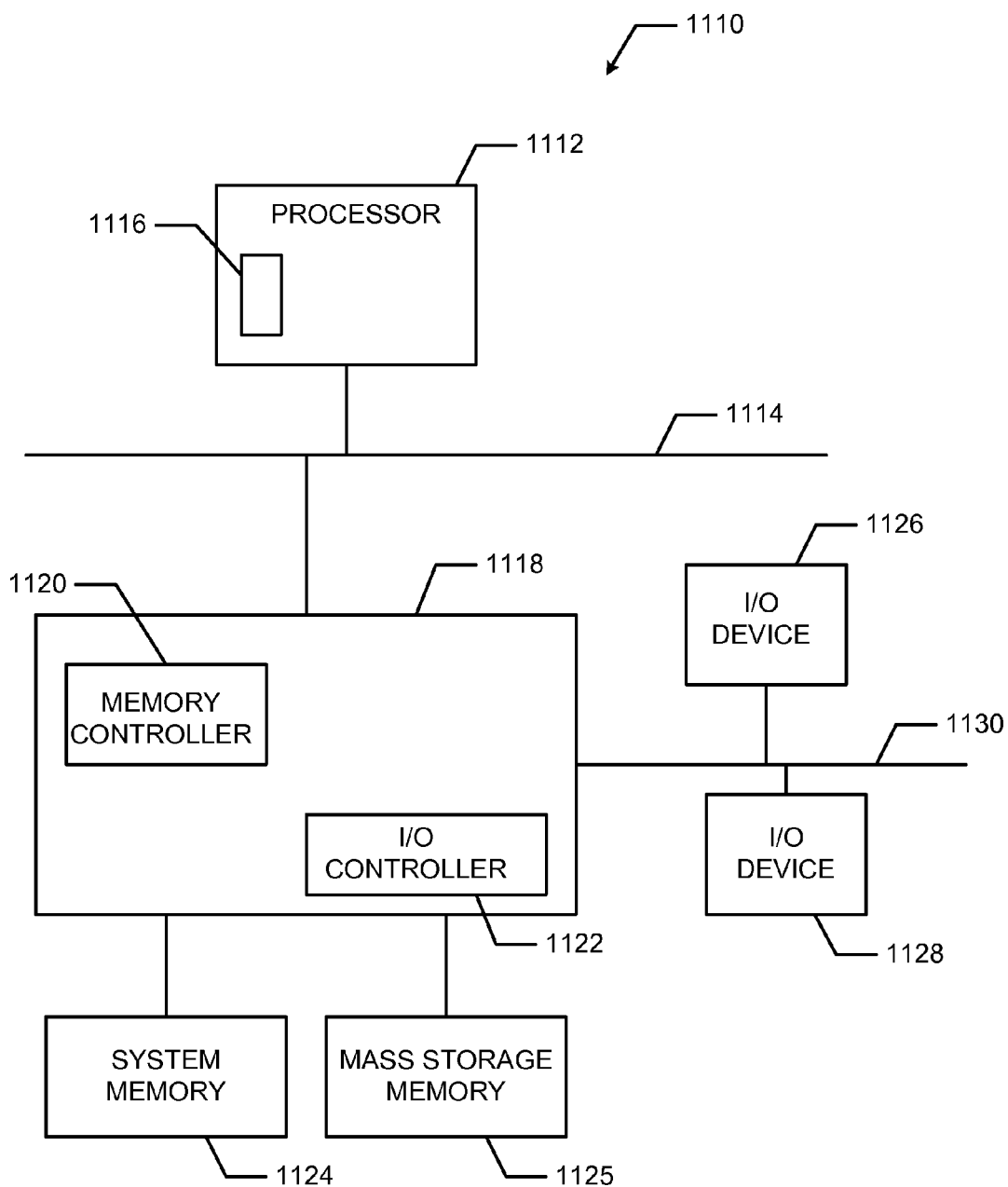
FIG. 11 is a block diagram of an example processor system that may be used to implement the methods and apparatus described herein.

FIG. 11 is a block diagram of an example processor system 1110 that may be used to implement the apparatus and methods described herein. As shown in FIG. 11, the processor system 1110 includes a processor 1112 that is coupled to an interconnection bus or network 1114. The processor 1112 includes a register set or register space 116, which is depicted in FIG. 11 as being entirely on-chip, but which could alternatively be located entirely or partially off-chip and directly coupled to the processor 1112 via dedicated electrical connections and/or via the interconnection network or bus 1114. The processor 1112 may be any suitable processor, processing unit or microprocessor. Although not shown in FIG. 11, the system 1110 may be a multi-processor system and, thus, may include one or more additional processors that are identical or similar to the processor 1112 and that are communicatively coupled to the interconnection bus or network 1114.

The processor 1112 of FIG. 11 is coupled to a chipset 1118, which includes a memory controller 1120 and an input/output (I/O) controller 1122. As is well known, a chipset typically provides I/O and memory management functions as well as a plurality of general purpose and/or special purpose registers, timers, etc. that are accessible or used by one or more processors coupled to the chipset. The memory controller 1120 performs functions that enable the processor 1112 (or processors if there are multiple processors) to access a system memory 1124 and a mass storage memory 1125.

The system memory 1124 may include any desired type of volatile and/or non-volatile memory such as, for example, static random access memory (SRAM), dynamic random access memory (DRAM), flash memory, read-only memory (ROM), etc. The mass storage memory 1125 may include any desired type of mass storage device including hard disk drives, optical drives, tape storage devices, etc.

The I/O controller 1122 performs functions that enable the processor 1112 to communicate with peripheral input/output (PO) devices 1126 and 1128 via an I/O bus 1130. The I/O devices 1126 and 1128 may be any desired type of I/O device such as, for example, a keyboard, a video display or monitor, a mouse, etc. While the memory controller 1120 and the I/O controller 1122 are depicted in FIG. 11 as separate functional blocks within the chipset 1118, the functions performed by these blocks may be integrated within a single semiconductor circuit or may be implemented using two or more separate integrated circuits.

The methods described herein may be implemented using instructions stored on a computer readable medium that are executed by the processor 1112. The computer readable medium may include any desired combination of solid state, magnetic and/or optical media implemented using any desired combination of mass storage devices (e.g., disk drive), removable storage devices (e.g., floppy disks, memory cards or sticks, etc.) and/or integrated memory devices (e.g., random access memory, flash memory, etc.).

Although certain methods, apparatus, and articles of manufacture have been described herein, the scope of coverage of this patent is not limited thereto.

What is claimed is:

1. A method of characterizing media comprising:
converting at least a portion of a block of audio into a frequency domain representation;
dividing the frequency domain representation into a plurality of bands;
determining a characteristic difference of a first band of the plurality of bands based on a comparison of a first characteristic of the first band and a second characteristic of a second band different from the first band, wherein the first characteristic of the first band occurs at a time that is different than a time at which the second characteristic of the second band takes place, and wherein the characteristic difference is determined differently based on whether a count value associated with the first band has a first property; and
determining a signature bit based on the characteristic difference.

2. A method as defined in claim 1, further comprising capturing a block of audio by obtaining audio via a hardwired connection.

3. A method as defined in claim 1, further comprising capturing a block of audio by obtaining audio via a wireless connection.

4. A method as defined in claim 1, wherein converting at least a portion of the block of audio into the frequency domain representation comprises the use of a Fourier transformation.

5. A method as defined in claim 1, wherein dividing the frequency domain representation into the plurality of bands comprises grouping frequency components that are adjacent in the frequency domain representation.

6. A method as defined in claim 5, wherein the frequency components have frequencies in an audible frequency range.

7. A method as defined in claim 1, wherein determining the characteristic of a selected band comprises determining an energy in the selected band.

8. A method as defined in claim 1, wherein the first band has a first frequency that is higher than a second frequency of the second band.

9. A method as defined in claim 8, wherein the comparison comprises a subtraction.

10. A method as defined in claim 1, wherein the first band has a first frequency that is higher than a second frequency of the second band, and wherein the first characteristic of the first band occurred later in time than the second characteristic of the second band.

11. A method as defined in claim 1, wherein the comparison comprises a subtraction.

12. A method as defined in claim 1, wherein the first band has a highest frequency that is lower than a lowest frequency of the second band.

13. A method as defined in claim 12, wherein the first characteristic of the first band occurred later in time than the second characteristic of the second band.

14. A method as defined in claim 1, wherein determining the signature bit based on the characteristic difference comprises comparing the characteristic difference to a value of zero.

15. A method as defined in claim 14, wherein determining the signature bit based on the characteristic difference further comprises comparing the characteristic difference to another characteristic difference.

16. A method as defined in claim 1, wherein the count value has the first property when the count value is an even number and does not have the first property when the count value is an odd number.

17. A signature generation system comprising:
a transformer to convert at least a portion of a block of audio into a frequency domain representation;
a divider to divide the frequency domain representation into a plurality of bands;
a characteristic determiner to determine a first characteristic of a first band of the plurality of bands and a second characteristic of a second band different from the first band, wherein the first characteristic of the first band occurs at a time that is different than a time at which the second characteristic of the second band takes place;
a subtractor to determine a characteristic difference between the first characteristic and the second characteristic, wherein the characteristic difference is determined differently based on whether a count value associated with the first band has a first property; and
a signature determiner to determine a signature bit based on the characteristic difference.

18. A signature generation system as defined in claim 17, further comprising a sample generator to capture a block of audio by obtaining audio via a hardwired connection.

19. A signature generation system as defined in claim 17, further comprising a sample generator to capture a block of audio by obtaining audio via a wireless connection.

20. A signature generation system as defined in claim 17, wherein converting at least a portion of the block of audio into the frequency domain representation comprises the use of a Fourier transformation.

21. A signature generation system as defined in claim 17, wherein dividing the frequency domain representation into the plurality of bands comprises grouping frequency components that are adjacent in the frequency domain representation.

22. A signature generation system as defined in claim 21, wherein the frequency components have frequencies in an audible frequency range.

23. A signature generation system as defined in claim 17, wherein determining the characteristic of a selected band comprises determining an energy in the selected band.

24. A signature generation system as defined in claim 23, wherein the first band has a lowest frequency that is higher than a highest frequency of the second band.

25. A signature generation system as defined in claim 24, wherein the first characteristic of the first band occurred later in time than the second characteristic of the second band.

26. A signature generation system as defined in claim 17, wherein the count value has the first property when the count value is an even number and does not have the first property when the count value is an odd number.

27. A tangible machine readable medium comprising instructions that, when executed, cause a machine to at least:
   convert at least a portion of a block of audio into a frequency domain representation;
   divide the frequency domain representation into a plurality of bands;
   determine a characteristic difference of a first band of the plurality of bands based on a comparison of a first characteristic of the first band and a second characteristic of a second band different from the first band, wherein the first characteristic of the first band occurs at a time that is different than a time at which the second characteristic of the second band takes place, and wherein the characteristic difference is determined differently based on whether a count value associated with the first band has a first property; and
   determine a signature bit based on the characteristic difference.

28. A machine readable medium as defined in claim 27, wherein the first band has a first frequency that is lower than a second frequency of the second band, and wherein the first characteristic of the first band occurred later in time than the second characteristic of the second band.

29. A machine readable medium as defined in claim 27, wherein determining the signature bit based on the characteristic difference comprises comparing the characteristic difference to a value of zero.

30. A machine readable medium as defined in claim 29, wherein determining the signature bit based on the characteristic difference further comprises comparing the characteristic difference to another characteristic difference.

31. A machine readable medium as defined in claim 27, wherein the count value has the first property when the count value is an even number and does not have first property when the count value is an odd number.

* * * * *